(12) United States Patent
Knapp

(10) Patent No.: US 10,781,373 B2
(45) Date of Patent: Sep. 22, 2020

(54) PHOTOALIGNMENT FILM FORMING COMPOSITION AND LCD DEVICES DERIVED THEREFROM

(71) Applicant: PROMERUS, LLC, Brecksville, OH (US)

(72) Inventor: Brian F Knapp, Brecksville, OH (US)

(73) Assignee: PROMERUS, LLC, Brecksville, OH (US)

( * ) Notice: Subject to any disclaimer, the term of this patent is extended or adjusted under 35 U.S.C. 154(b) by 213 days.

(21) Appl. No.: 15/892,472

(22) Filed: Feb. 9, 2018

(65) Prior Publication Data

US 2018/0223190 A1 Aug. 9, 2018

Related U.S. Application Data

(60) Provisional application No. 62/456,747, filed on Feb. 9, 2017.

(51) Int. Cl.
| | | |
|---|---|---|
| *C09K 19/56* | (2006.01) | |
| *C08G 61/08* | (2006.01) | |
| *C09D 165/00* | (2006.01) | |
| *G02F 1/1337* | (2006.01) | |
| *G02F 1/1339* | (2006.01) | |
| *G02F 1/1341* | (2006.01) | |

(52) U.S. Cl.
CPC .............. *C09K 19/56* (2013.01); *C08G 61/08* (2013.01); *C09D 165/00* (2013.01); *G02F 1/1339* (2013.01); *G02F 1/1341* (2013.01); *G02F 1/133711* (2013.01); *G02F 1/133788* (2013.01); *C08G 2261/149* (2013.01); *C08G 2261/228* (2013.01); *C08G 2261/3221* (2013.01); *C08G 2261/3324* (2013.01); *C08G 2261/90* (2013.01); *G02F 2202/022* (2013.01); *Y10T 428/10* (2015.01); *Y10T 428/1005* (2015.01)

(58) Field of Classification Search
CPC .. C09K 19/56; C08G 61/08; C08G 2261/149; C08G 2261/228; C08G 2261/3221; C08G 2261/3324; G02F 1/133711; G02F 1/133788; G02F 1/1339; G02F 2202/022; Y10T 428/10; Y10T 428/1005
USPC ........... 428/1.1, 1.2; 522/154; 526/281, 282; 560/75, 194; 568/665, 667
See application file for complete search history.

(56) References Cited

U.S. PATENT DOCUMENTS

| | | |
|---|---|---|
| 2006/0159865 A1 | 7/2006 | Kim et al. |
| 2012/0056183 A1 | 3/2012 | Mueller et al. |

OTHER PUBLICATIONS

Written Opinion of the PCT Application No. PCT/US2018/017529, Filing Date, Feb. 9, 2018, six pages.

*Primary Examiner* — Ruiyun Zhang
(74) *Attorney, Agent, or Firm* — Balaram Gupta

(57) ABSTRACT

Embodiments in accordance with the present invention provides for the photoalignment layer for liquid crystal displays, a liquid crystal display device using the photoalignment layer and a manufacturing method. The photoalignment layer encompasses polynorbornene (PNB) polymers among other additives. More specifically, embodiments of this invention include a method for the fabrication of a liquid crystal display and the photoalignment layer encompassing the PNB polymers.

21 Claims, 7 Drawing Sheets

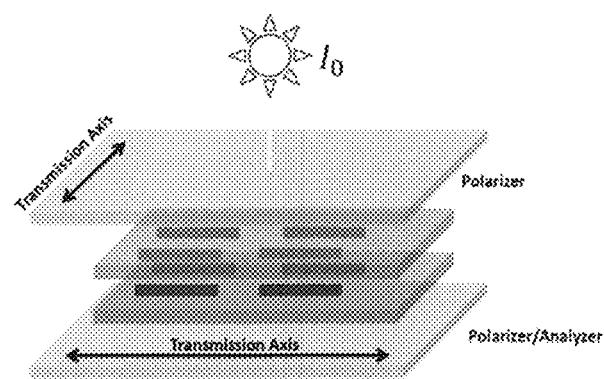
$$I = I_0 \sin^2(2\varphi)\sin^2\left(\frac{\pi \Delta n_{eff} d}{\lambda}\right)$$
FIG. 7
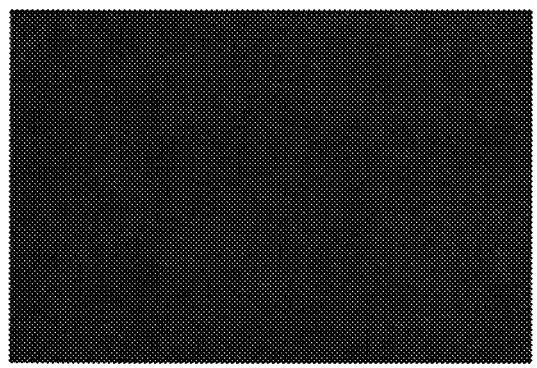 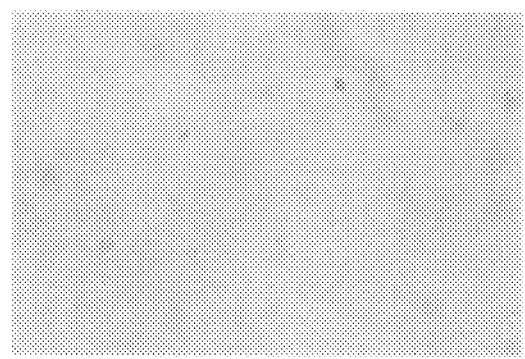
600 μm
FIG. 8A　　　　　　　　　　FIG. 8B

PHOTOALIGNMENT FILM FORMING COMPOSITION AND LCD DEVICES DERIVED THEREFROM

CROSS REFERENCE TO RELATED APPLICATIONS

This application claims the benefit of U.S. Provisional Application No. 62/456,747, filed Feb. 9, 2017, which is incorporated herein by reference in its entirety.

BACKGROUND OF THE INVENTION

Field of the Invention

Embodiments in accordance with the present invention relate generally to photoalignment layers encompassing a variety of functionalized polynorbornene (PNB) polymers. More specifically, embodiments of this invention include photoalignment layers formed from polynorbornene polymers and a method of forming such layers. The photoaligned polymer layers of this invention are useful in a variety of liquid crystal displays as well as non-display devices such as optically patternable interference filters, polarizers, optical retarders, among others.

Description of the Art

Flat panel liquid crystal display (LCD) devices are widely used in a variety of applications including televisions (TVs), computer screens/monitors, lap-top computers, mobile devices, among others. In a typical LCD device there are two panels, a pixel electrode and a common electrode, and a liquid crystal layer interposed therebetween. In order for liquid crystals to function effectively as an optical switch the liquid crystals are typically aligned in a predetermined direction. This predetermined direction of the liquid crystals are generally facilitated by a polymer layer, which allows the liquid crystal to be oriented in a specific direction. See, generally, U. S. Patent Application Publication US2016/0230095A1.

Further, the alignment layers not only provide alignment of the liquid crystals but also aid liquid crystals to be oriented in certain pretilt angle as well as function as an anchor for liquid crystals. The alignment of liquid crystals are performed by various techniques in the art. For example, a rubbing method is used wherein typically a polymer film such as a polyimide on a substrate such as glass is used. Then rubbing the surface of such film in a predetermined direction by fibers or cloth material such as nylon or polyester is used. However, this method suffers from several drawbacks, such as for example, practical difficulties, including debris left by fibers or cloth material can lead to defects as well as the static charge buildup can attract particles leading to defects. The rubbing technique also lacks precision leading to uneven surface thus lacking control on the liquid crystal gap between the substrates. Even more importantly the rubbing method lacks alignment of multiple domains of liquid crystal, which is particularly important for wide viewing angle. That is, the restricted viewing angles arise from the uniaxial nature of the alignment process. This problem may be circumvented if molecular alignment is varied, in a controlled manner, within individual pixels.

In order to address some of the problems associated with rubbing technology photoalignment layers have been used recently, which addresses some of the above noted problems. Notably, the photoalignment method essentially removes any debris left behind the surface as well as any static buildup. Further, the photoalignment approach does not deform the substrate and allows for the formation of multiple domains, thereby allowing for fabrication of stable, multi-domain pixel displays with improved fields of view.

Typically in a photoalignment approach a photoactive polymer layer is formed on a substrate which when exposed to actinic radiation allows the polymeric material to align itself such that the liquid crystal disposed thereon is properly aligned, anchored and can be oriented at a certain angle. The photoactive polymers used in this approach include photoisomerizable polymers, such as for example, polymers having azo groups, photodimerizable polymers, such as polymers having coumarins or cinnamate groups, photocrosslikable polymers, photodecomposable polymers such as polyimides, and so on. The photoalignment is achieved by exposing the polymer layer to a linearly polarized light.

However, even the photoalignment method suffers from several drawbacks. For example, polycinnamate-based polymers, such as poly(vinyl cinnamate) (PVCN) and poly(vinyl methoxycinnamate) (PVMC) exhibit poor thermal stability, see for example, M. Schadt et al., Nature, 1996, 381, 212-214. Other disadvantages of such photopolymers may also include poor mobility of the polymer either due to excessive crosslinking and/or side chain having a photosensitive group with a rigid main chain, and so on. See for example, Japanese Patent Laid-Open Publication No. Hei. 11-181127, which discloses acrylate and methacrylate polymers having a side chain photosensitive group, such as cinnamic acid. Also see, U.S. Pat. No. 7,541,073 B2.

In addition, there is a need to develop a photoactive polymer which can be readily processed into a film and can be readily aligned by a linearly polarized light, and exhibit excellent thermal stability.

Accordingly, it is an object of this invention to provide a thermally stable photoactive polymer which can be formed into film and can be aligned readily when exposed to suitable radiation.

It is also an object of this invention to provide processes for the formation of a photoaligned film as disclosed herein.

It is further an object of this invention to provide a liquid crystal display device encompassing a photoaligned film and a liquid crystal exhibiting excellent properties.

Other objects and further scope of the applicability of the present invention will become apparent from the detailed description that follows.

SUMMARY OF THE INVENTION

It has now been found that a polymer derived from certain norbornene monomers as described herein exhibit excellent photoaligning properties when a layer of the polymer is exposed to suitable linear polarized light. The aligned polymeric layer can further be fabricated into a liquid crystal display device by filling liquid crystals between two such aligned polymeric layers.

BRIEF DESCRIPTION OF THE DRAWINGS

Embodiments in accordance with the present invention are described below with reference to the following accompanying figures and/or images. Where drawings are provided, it will be drawings which are simplified portions of a device provided for illustrative purposes only.

FIG. 7 shows the analytical method used to measure the degree of alignment of liquid crystals within the fabricated cell. As drawn, the polarizer (top) is perpendicular in direction to the analyzer (bottom).

FIG. 8A and FIG. 8B are respectively optical micrographs taken from the light transmitted from the photoaligned liquid crystal glass substrates as shown in FIG. 7; FIG. 8A is when the polarizer is perpendicular to the analyzer ($\varphi=90°$), and FIG. 8B is when the polarizer is 45° to the analyzer ($\varphi=45°$).

DETAILED DESCRIPTION OF THE INVENTION

Figure 1A:
FIG. 1A and FIG. 1B respectively show indium tin oxide (ITO) coated glass substrate.

The terms as used herein have the following meanings:

As used herein, the articles "a," "an," and "the" include plural referents unless otherwise expressly and unequivocally limited to one referent.

Since all numbers, values and/or expressions referring to quantities of ingredients, reaction conditions, etc., used herein and in the claims appended hereto, are subject to the various uncertainties of measurement encountered in obtaining such values, unless otherwise indicated, all are to be understood as modified in all instances by the term "about."

Where a numerical range is disclosed herein such range is continuous, inclusive of both the minimum and maximum values of the range as well as every value between such minimum and maximum values. Still further, where a range refers to integers, every integer between the minimum and maximum values of such range is included. In addition, where multiple ranges are provided to describe a feature or characteristic, such ranges can be combined. That is to say that, unless otherwise indicated, all ranges disclosed herein are to be understood to encompass any and all sub-ranges subsumed therein. For example, a stated range of from "1 to 10" should be considered to include any and all sub-ranges between the minimum value of 1 and the maximum value of 10. Exemplary sub-ranges of the range 1 to 10 include, but are not limited to, 1 to 6.1, 3.5 to 7.8, and 5.5 to 10, etc.

As used herein, the symbol "〰" denotes a position at which the bonding takes place with another repeat unit or another atom or molecule or group or moiety as appropriate with the structure of the group as shown.

As used herein, "hydrocarbyl" refers to a group that contains carbon and hydrogen atoms, non-limiting examples being alkyl, cycloalkyl, aryl, aralkyl, alkaryl, and alkenyl. The term "halohydrocarbyl" refers to a hydrocarbyl group where at least one hydrogen has been replaced by a halogen. The term perhalocarbyl refers to a hydrocarbyl group where all hydrogens have been replaced by a halogen.

As used herein, the expression "$(C_1-C_6)$alkyl" includes methyl and ethyl groups, and straight-chained or branched propyl, butyl, pentyl and hexyl groups. Particular alkyl groups are methyl, ethyl, n-propyl, isopropyl and tert-butyl. Derived expressions such as "$(C_1-C_4)$alkoxy", "$(C_1-C_4)$thioalkyl", "$(C_1-C_4)$alkoxy$(C_1-C_4)$alkyl", "hydroxy$(C_1-C_4)$alkyl", "$(C_1-C_4)$alkylcarbonyl", "$(C_1-C_4)$alkoxycarbonyl$(C_1-C_4)$alkyl", "$(C_1-C_4)$alkoxycarbonyl", "diphenyl$(C_1-C_4)$alkyl", "phenyl$(C_1-C_4)$alkyl", "phenylcarboxy$(C_1-C_4)$alkyl" and "phenoxy$(C_1-C_4)$alkyl" are to be construed accordingly.

As used herein, the expression "cycloalkyl" includes all of the known cyclic groups. Representative examples of "cycloalkyl" includes without any limitation cyclopropyl, cyclobutyl, cyclopentyl, cyclohexyl, cycloheptyl, cyclooctyl, and the like. Derived expressions such as "cycloalkoxy", "cycloalkylalkyl", "cycloalkylaryl", "cycloalkylcarbonyl" are to be construed accordingly.

As used herein, the expression "$(C_1-C_6)$perfluoroalkyl" means that all of the hydrogen atoms in said alkyl group are replaced with fluorine atoms. Illustrative examples include trifluoromethyl and pentafluoroethyl, and straight-chained or branched heptafluoropropyl, nonafluorobutyl, undecafluoropentyl and tridecafluorohexyl groups. Derived expression, "$(C_1-C_6)$perfluoroalkoxy", is to be construed accordingly. It should further be noted that certain of the alkyl groups as described herein, such as for example, "$(C_1-C_6)$alkyl" may partially be fluorinated, that is, only portions of the hydrogen atoms in said alkyl group are replaced with fluorine atoms and shall be construed accordingly.

As used herein, the expression "$(C_6-C_{10})$aryl" means substituted or unsubstituted phenyl or naphthyl. Specific examples of substituted phenyl or naphthyl include o-, p-, m-tolyl, 1,2-, 1,3-, 1,4-xylyl, 1-methylnaphthyl, 2-methylnaphthyl, etc. "Substituted phenyl" or "substituted naphthyl" also include any of the possible substituents as further defined herein or one known in the art.

As used herein, the expression "$(C_6-C_{10})$aryl$(C_1-C_4)$alkyl" means that the $(C_6-C_{10})$aryl as defined herein is further attached to $(C_1-C_4)$alkyl as defined herein. Representative examples include benzyl, phenylethyl, 2-phenylpropyl, 1-naphthylmethyl, 2-naphthylmethyl and the like.

"Halogen" or "halo" means chloro, fluoro, bromo, and iodo.

In a broad sense, the term "substituted" is contemplated to include all permissible substituents of organic compounds. In a few of the specific embodiments as disclosed herein, the term "substituted" means substituted with one or more substituents independently selected from the group consisting of $(C_1-C_6)$alkyl, $(C_2-C_6)$alkenyl, $(C_1-C_6)$perfluoroalkyl, phenyl, hydroxy, —$CO_2H$, an ester, an amide, $(C_1-C_6)$alkoxy, $(C_1-C_6)$thioalkyl and $(C_1-C_6)$perfluoroalkoxy. However, any of the other suitable substituents known to one skilled in the art can also be used in these embodiments.

It should be noted that any atom with unsatisfied valences in the text, schemes, examples and tables herein is assumed to have the appropriate number of hydrogen atom(s) to satisfy such valences.

By the term "derived" is meant that the polymeric repeating units are polymerized (formed) from, for example, polycyclic norbornene-type monomers in accordance with formulae (I) and/or (II) wherein the resulting polymers are formed by 2,3 enchainment of norbornene-type monomers as shown below:

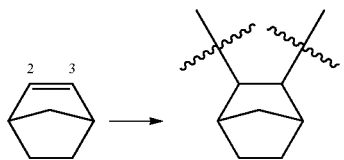

Accordingly, in accordance with the practice of this invention there is provided a photoalignment layer comprising a polymer, said polymer comprising one or more repeating units distinct from each other and each represented by formula (IA), said repeating unit is derived from a corresponding monomer of formula (I):

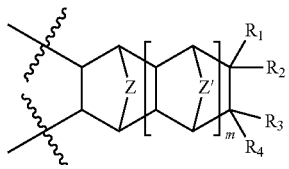

(IA)

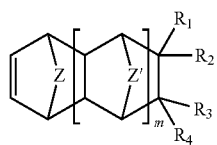

(I)

wherein:

∿∿ represents a position at which the bonding takes place with another repeat unit;

Z and Z' are the same or different and independently of each other selected from the group consisting of —$CH_2$—, —$CH_2$—$CH_2$— and —O—;

m is an integer from 0 to 5;

at least one of $R_1$, $R_2$, $R_3$ or $R_4$ is selected from the group consisting of:

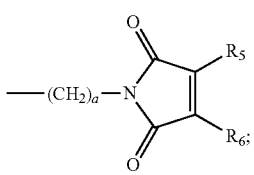

(A)

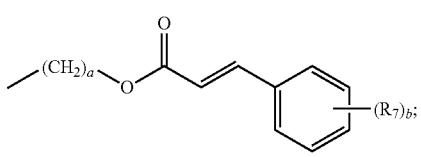

(B)

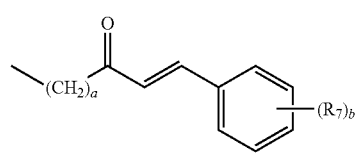

(C)

-continued

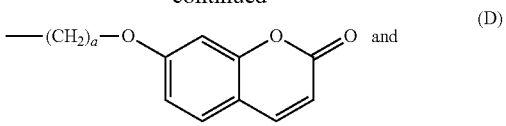

(D)

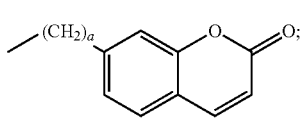

(E)

wherein:

a is an integer from 1 to 12;

b is an integer from 1 to 4;

$R_5$ and $R_6$ are each independently of one another selected from the group consisting of hydrogen, methyl, ethyl and linear or branched ($C_3$-$C_4$)alkyl; or $R_5$ and $R_6$ taken together with the carbon atoms to which they are attached form a substituted or unsubstituted ($C_5$-$C_5$)cyclic ring;

$R_7$ is selected from the group consisting of methyl, ethyl, linear or branched ($C_3$-$C_4$)alkyl, methoxy, ethoxy, linear or branched ($C_3$-$C_4$)alkoxy, ($C_6$-$C_{10}$)aryl and ($C_6$-$C_{10}$)aryloxy;

the remaining $R_1$, $R_2$, $R_3$ and $R_4$ are the same or different and independently of each other selected from the group consisting of hydrogen, halogen, methyl, ethyl, a fluorinated or perfluorinated methyl or ethyl, linear or branched substituted or unsubstituted ($C_3$-$C_{12}$)alkyl, substituted or unsubstituted ($C_1$-$C_6$)alkoxy, substituted or unsubstituted ($C_3$-$C_8$) cycloalkyl, substituted or unsubstituted ($C_7$-$C_{12}$) bicycloalkyl and substituted or unsubstituted ($C_7$-$C_{12}$) tricycloalkyl, substituted or unsubstituted ($C_1$-$C_{12}$)alkyl($C_3$-$C_8$)cycloalkyl, substituted or unsubstituted ($C_6$-$C_{10}$)aryl and substituted or unsubstituted ($C_1$-$C_{12}$)alkyl($C_6$-$C_{16}$)aryl where said substituents are selected from halogen, hydroxy, ($C_1$-$C_6$)alkyl, ($C_1$-$C_6$)alkoxy, ($C_2$-$C_6$)alkenyl, ($C_3$-$C_5$)cycloalkyl, ($C_7$-$C_{12}$)bicycloalkyl, ($C_1$-$C_6$)alkoxy($C_3$-$C_6$)alkyl, ($C_1$-$C_6$)alkoxy($C_3$-$C_8$)cycloalkyl and ($C_1$-$C_6$)alkoxy($C_7$-$C_{12}$)bicycloalkyl.

As noted, the polymers as used herein may contain one or more monomers of formula (I). Accordingly, in some embodiments of this invention the polymers of this invention contains only one monomer. That is, polymers used to form a photoaligned layer of this invention are homopolymers. In some other embodiments of this invention the polymer used to form a photoaligned layer of this invention contain two, three, four or more monomers. Accordingly, all such combinations are part of this invention.

In some embodiments of this invention, the polymer used to form the photoaligned layer further encompasses one or more repeating units distinct from each other and each represented by formula (IIA), said repeating unit is derived from a corresponding monomer of formula (II):

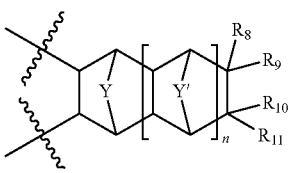

(IIA)

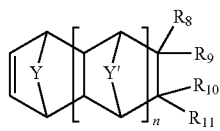

(II)

wherein

∿∿ represents a position at which the bonding takes place with another repeat unit;

n is an integer from 0 to 3;

Y and Y' are the same or different and independently of each other selected from the group consisting of —CH$_2$—, —CH$_2$—CH$_2$— and —O—;

R$_8$, R$_9$, R$_{10}$ and R$_{11}$ are the same or different and independently of each other selected from the group consisting of hydrogen, methyl, ethyl, a fluorinated or perfluorinated methyl or ethyl, a linear or branched substituted or unsubstituted (C$_3$-C$_{25}$)hydrocarbyl group, substituted or unsubstituted (C$_1$-C$_{25}$)heterohydrocarbyl group, substituted or unsubstituted (C$_3$-C$_{25}$)cyclic hydrocarbyl group, substituted or unsubstituted (C$_6$-C$_{25}$)polycyclic hydrocarbyl group, substituted or unsubstituted (C$_3$-C$_{25}$)cyclic heterohydrocarbyl group and substituted or unsubstituted (C$_6$-C$_{25}$)polycyclic heterohydrocarbyl group.

Accordingly, in some embodiments the polymer employed to form the photoaligned layers of this invention contain at least two monomers, one monomer derived from monomer of formula (I) and one monomer derived from monomer of formula (II). Any of such combination of copolymers within the scope of formulae (I) and (II) can be employed. In some other embodiments of this invention the polymer employed contains two distinct monomers of formula (I) and one monomer of formula (II). In some other embodiments of this invention more than one monomer of formula (I) and more than one monomer of formula (II) are employed to form the polymer which is used to form the photoaligned layer. Again all such combinations are within the scope of this invention.

In some embodiments of this invention, the photoalignment layer of this invention is made from a polymer derived from a monomer of formula (I), wherein m is 0 or 1. In another aspect of this invention some of the monomers that maybe employed to form the polymers are selected from the group consisting of:

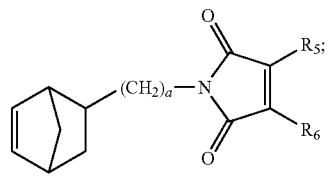

(IA$_1$)

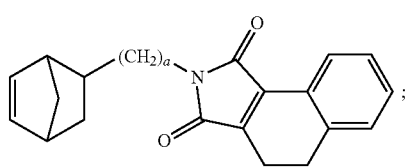

(IB$_1$)

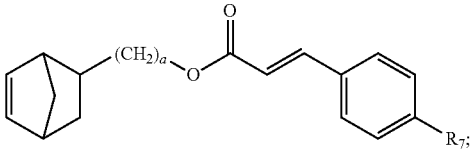

(IC$_1$)

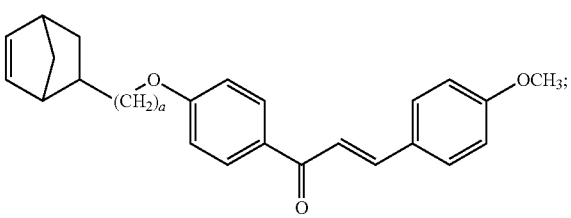

(ID$_1$)

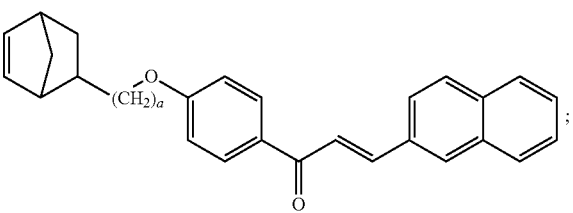

(IE$_1$)

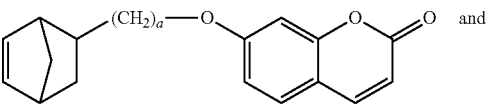

(IF$_1$)

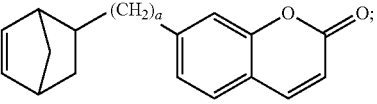

(IG$_1$)

wherein:

a is an integer from 1 to 12;

R$_5$ and R$_6$ are each independently of one another selected from the group consisting of hydrogen, methyl and ethyl;

R$_7$ is selected from the group consisting of methyl, ethyl, methoxy, ethoxy, phenyl and phenoxy.

Non-limiting examples of monomers within the scope of formula (I) that maybe employed to form the polymers employed herein are selected from the group consisting of:

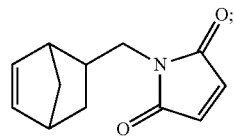

1-(bicyclo[2.2.1]hept-5-en-2-ylmethyl)-1H-pyrrole-2,5-dione

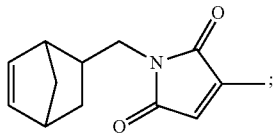

1-(bicyclo[2.2.1]hept-5-en-2-ylmethyl)-3-methyl-1H-pyrrole-2,5-dione

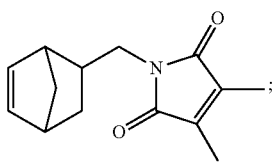

1-(bicyclo[2.2.1]hept-5-en-2-ylmethyl)-3,4-dimethyl-1H-pyrrole-2,5-dione

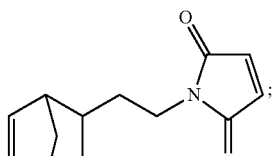

1-(2-(bicyclo[2.2.1]hept-5-en-2-yl)ethyl)-1H-pyrrole-2,5-dione

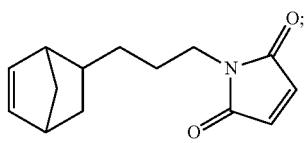

1-(3-(bicyclo[2.2.1]hept-5-en-2-yl)propyl)-1H-pyrrole-2,5-dione

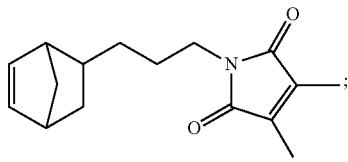

1-(3-(bicyclo[2.2.1]hept-5-en-2-yl)propyl)-3,4-dimethyl-1H-pyrrole-2,5-dione

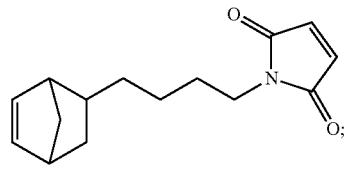

1-(4-(bicyclo[2.2.1]hept-5-en-2-yl)butyl)-1H-pyrrole-2,5-dione

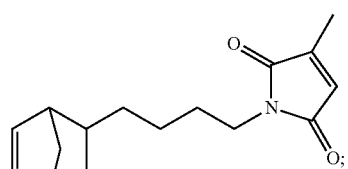

1-(4-(bicyclo[2.2.1]hept-5-en-2-yl)butyl)-3-methyl-1H-pyrrole-2,5-dione

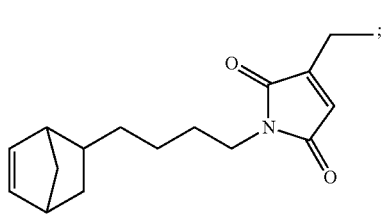

1-(4-(bicyclo[2.2.1]hept-5-en-2-yl)butyl)-3-ethyl-1H-pyrrole-2,5-dione

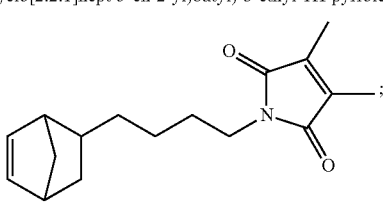

1-(4-(bicyclo[2.2.1]hept-5-en-2-yl)butyl)-3,4-dimethyl-1H-pyrrole-2,5-dione

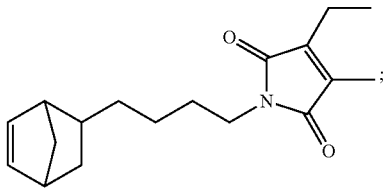

1-(4-(bicyclo[2.2.1]hept-5-en-2-yl)butyl)-3-ethyl-4-methyl-1H-pyrrole-2,5-dione

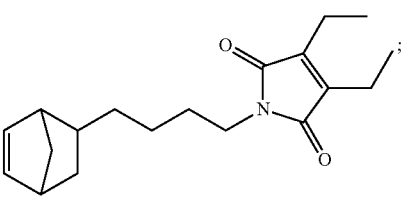

1-(4-(bicyclo[2.2.1]hept-5-en-2-yl)butyl)-3,4-diethyl-1H-pyrrole-2,5-dione

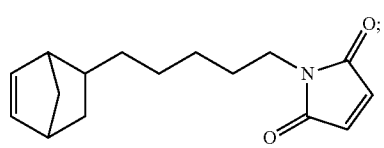

1-(5-(bicyclo[2.2.1]hept-5-en-2-yl)pentyl)-1H-pyrrole-2,5-dione

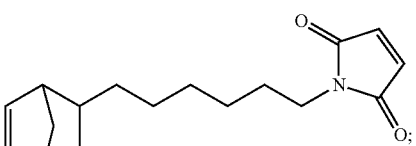

1-(6-(bicyclo[2.2.1]hept-5-en-2-yl)hexyl)-1H-pyrrole-2,5-dione

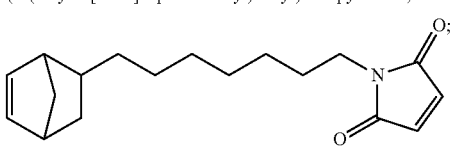

1-(7-(bicyclo[2.2.1]hept-5-en-2-yl)heptyl)-1H-pyrrole-2,5-dione

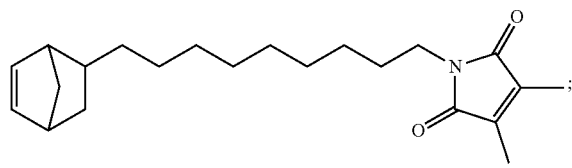

1-(9-(bicyclo[2.2.1]hept-5-en-2-yl)nonyl)-3,4-dimethyl-1H-pyrrole-2,5-dione

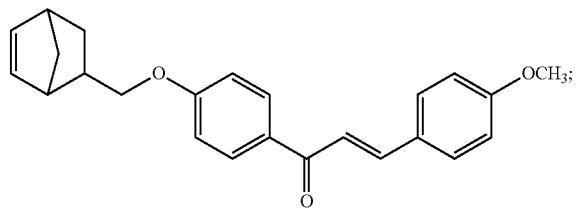

1-(4-(bicyclo[2.2.1]hept-5-en-2-ylmethoxy)phenyl)-3-(4-methoxyphenyl)prop-2-en-1-one -continued

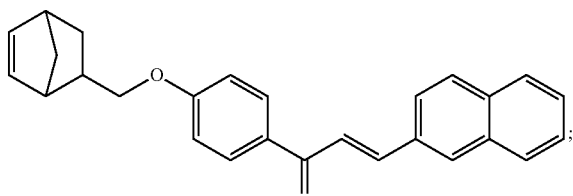

1-(4-(bicyclo[2.2.1]hept-5-en-2-ylmethoxy)phenyl)-3-(naphthalen-2-yl)prop-2-en-1-one

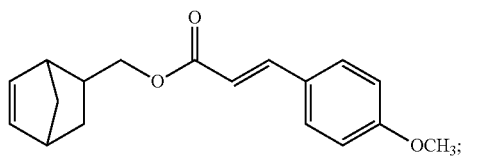

bicyclo[2.2.1]hept-5-en-2-ylmethyl) (E)-3-4-methoxyphenyl)acrylate

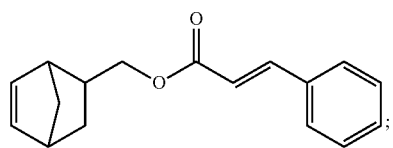

bicyclo[2.2.1]hept-5-en-2-ylmethyl cinnamate

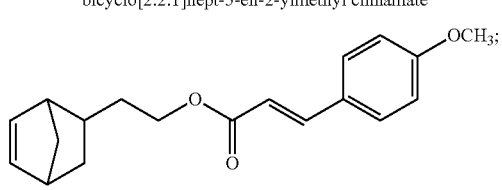

2-(bicyclo[2.2.1]hept-5-en-2-yl)ethyl) (E)-3-(4-methoxyphenyl)acrylate

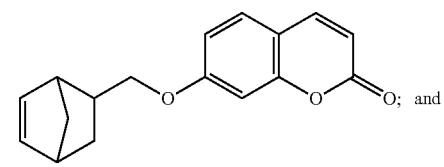

7-(bicyclo[2.2.1]hept-5-en-2-ylmethoxy)-2H-chromen-2-one

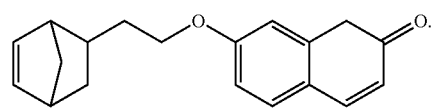

7-(2-(bicyclo[2.2.1]hept-5-en-2-yl)ethoxy)naphthalen-2(1H)-one

In some other embodiments, non-limiting examples of monomers within the scope of formula (II) that maybe employed to form the polymers employed herein are selected from the group consisting of:

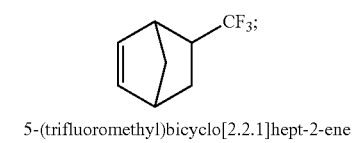

5-(trifluoromethyl)bicyclo[2.2.1]hept-2-ene

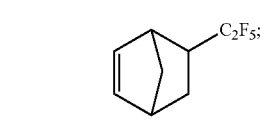

5-(perfluoromethyl)bicyclo[2.2.1]hept-2-ene

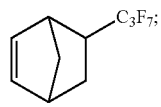

5-(perfluoro-n-propyl)bicyclo[2.2.1]hept-2-ene

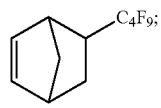

5-(perfluoro-n-butyl)bicyclo[2.2.1]hept-2-ene

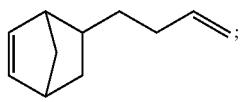

5-(but-3-en-1-yl)bicyclo[2.2.1]hept-2-ene

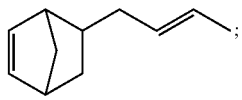

5-(but-2-en-1-yl)bicyclo[2.2.1]hept-2-ene

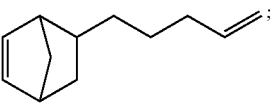

5-(pent-4-en-1-yl)bicyclo[2.2.1]hept-2-ene

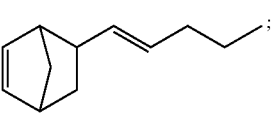

5-(pent-1-en-1-yl)bicyclo[2.2.1]hept-2-ene

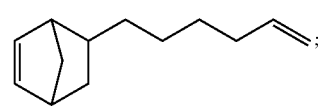

5-(hex-5-en-1-yl)bicyclo[2.2.1]hept-2-ene

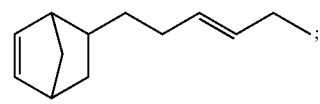

5-(hex-3-en-1-yl)bicyclo[2.2.1]hept-2-ene

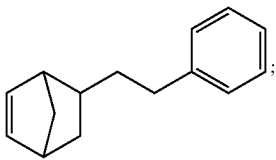

5-phenethylbicyclo[2.2.1]hept-2-ene

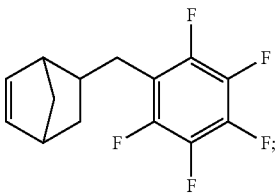

5-((perfluorophenyl)methyl)bicyclo[2.2.1]hept-2-ene

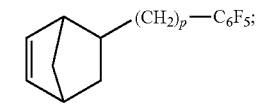

5-((perfluorophenyl)alkyl)bicyclo[2.2.1]hept-2-ene (NBalkylC$_6$F$_5$), where p = 2 (ethyl), 3 (propyl), 4 (butyl), 5 (pentyl) or 6 (hexyl)

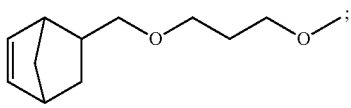

5-((3-methoxypropoxy)methyl)bicyclo[2.2.1]hept-2-ene

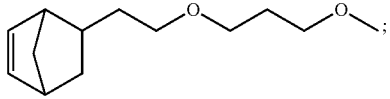

5-(2-(3-methoxypropoxy)ethyl)bicyclo[2.2.1]hept-2-ene

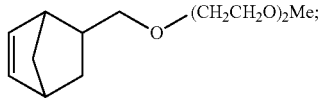

5-((2-(2-methoxyethoxy)ethoxy)methyl)bicyclo[2.2.1]hept-2-ene (NBTON)

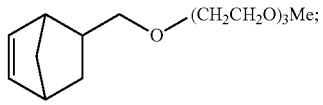

1-(bicyclo[2.2.1]hept-5-en-2-yl)-2,5,8,11-tetraoxadodecane (NBTODD)

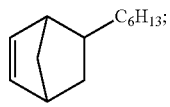

5-hexylbicyclo[2.2.1]hept-2-ene (HexNB)

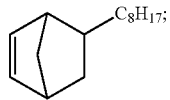

5-octylbicyclo[2.2.1]hept-2-ene (OctNB)

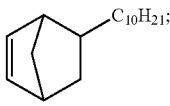

5-decylbicyclo[2.2.1]hept-2-ene (DecNB)

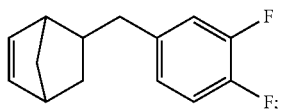

5-(3,4-difluorobenzyl)bicyclo[2.2.1]hept-2-ene (NBCH$_2$C$_6$H$_3$F$_2$)

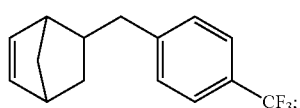

5-(4-(trifluoromethyl)benzyl)bicyclo[2.2.1]hept-2-ene (NBCH$_2$C$_6$H$_4$F$_3$)

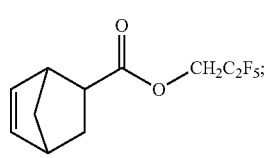

2,2,3,3,3-pentafluoropropyl bicyclo[2.2.1]hept-5-ene-2-carboxylate (PFPrCNB)

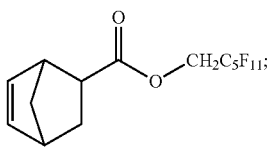

perfluoropentylmethyl bicyclo[2.2.1]hept-5-ene-2-carboxylate (PFPMeCNB)

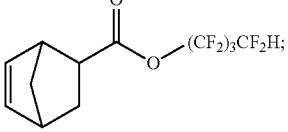

1,1,2,2,3,3,4,4-octafluorobutyl bicyclo[2.2.1]hept-5-ene-2-carboxylate (FOCHNB)

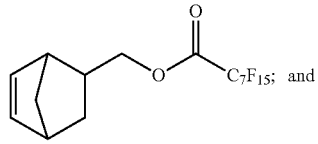

bicyclo[2.2.1]hept-5-en-2-ylmethyl perfluorooctanoate (C$_8$PFAcNB); and

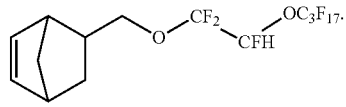

5-((1,1,2-triflouro-2-perfluoropropoxy)ethoxy)methyl)bicyclo[2.2.1]hept-2-ene (PPVENB)

Accordingly, in some embodiments of this invention, the polymer employed is a homopolymer derived from any one of the monomers selected from the following:

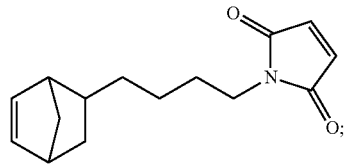

1-(4-(bicyclo[2.2.1]hept-5-en-2-yl)butyl)-1H-pyrrole-2,5-dione

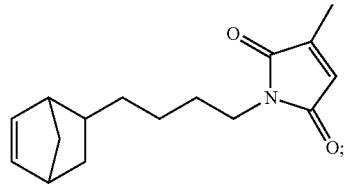

1-(4-(bicyclo[2.2.1]hept-5-en-2-yl)butyl)-3-methyl-1H-pyrrole-2,5-dione

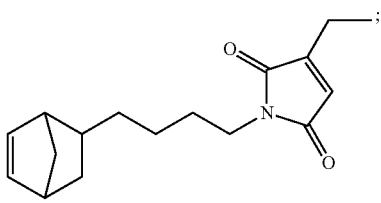

1-(4-(bicyclo[2.2.1]hept-5-en-2-yl)butyl)-3-ethyl-1H-pyrrole-2,5-dione

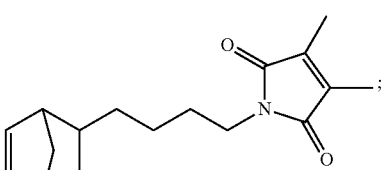

1-(4-(bicyclo[2.2.1]hept-5-en-2-yl)butyl)-3,4-dimethyl-1H-pyrrole-2,5-dione

-continued

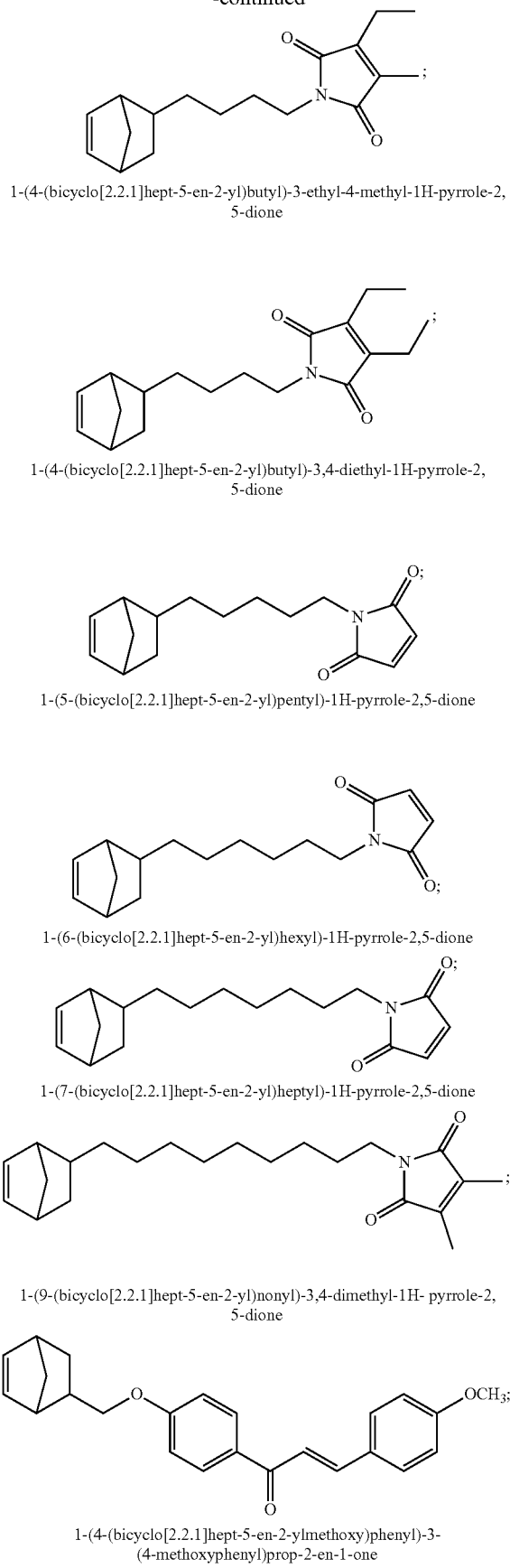

1-(4-(bicyclo[2.2.1]hept-5-en-2-yl)butyl)-3-ethyl-4-methyl-1H-pyrrole-2,5-dione 1-(4-(bicyclo[2.2.1]hept-5-en-2-yl)butyl)-3,4-diethyl-1H-pyrrole-2,5-dione 1-(5-(bicyclo[2.2.1]hept-5-en-2-yl)pentyl)-1H-pyrrole-2,5-dione 1-(6-(bicyclo[2.2.1]hept-5-en-2-yl)hexyl)-1H-pyrrole-2,5-dione 1-(7-(bicyclo[2.2.1]hept-5-en-2-yl)heptyl)-1H-pyrrole-2,5-dione 1-(9-(bicyclo[2.2.1]hept-5-en-2-yl)nonyl)-3,4-dimethyl-1H-pyrrole-2,5-dione 1-(4-(bicyclo[2.2.1]hept-5-en-2-ylmethoxy)phenyl)-3-(4-methoxyphenyl)prop-2-en-1-one -continued

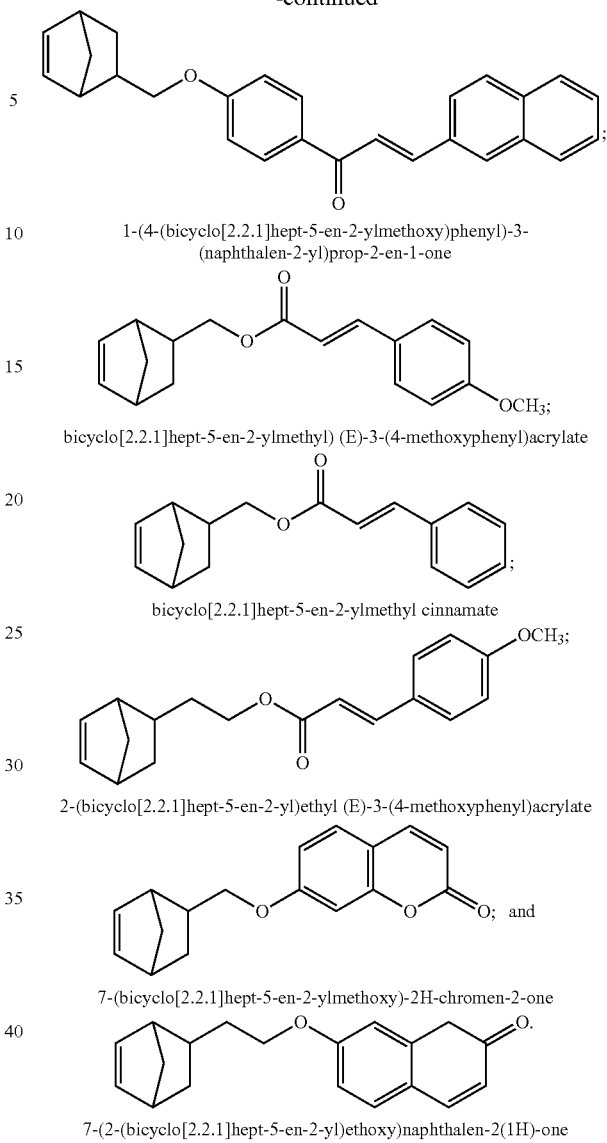

1-(4-(bicyclo[2.2.1]hept-5-en-2-ylmethoxy)phenyl)-3-(naphthalen-2-yl)prop-2-en-1-one bicyclo[2.2.1]hept-5-en-2-ylmethyl (E)-3-(4-methoxyphenyl)acrylate bicyclo[2.2.1]hept-5-en-2-ylmethyl cinnamate 2-(bicyclo[2.2.1]hept-5-en-2-yl)ethyl (E)-3-(4-methoxyphenyl)acrylate 7-(bicyclo[2.2.1]hept-5-en-2-ylmethoxy)-2H-chromen-2-one 7-(2-(bicyclo[2.2.1]hept-5-en-2-yl)ethoxy)naphthalen-2(1H)-one The polymers as described herein can be synthesized by any of the procedures known to one skilled in the art. Specifically, several of the starting materials and the polymers as used herein are known in the literature. In addition, the polymers and the monomers as described herein may also be prepared by methods used to prepare similar polymers and monomers as reported in the literature. See specifically, U.S. Pat. Nos. 9,175,123 B2 and 9,341,949 B2 pertinent portions of which are incorporated herein by reference.

Advantageously, it has been observed that use of certain photosensitizers can decrease the exposure dosage of the linearly polarized electromagnetic radiation needed for the photoalignment of the polymer layer. Accordingly, there is provided in some embodiments of this invention the polymer layer encompassing a photosensitizer. The photosensitizers generally provide further enhancement for the photoalignment of the polymer layer at a preselected wavelength based on the photosensitizer employed thereby reducing the exposure dosage. In general, such wavelength can be from 200 to 700 nm. As needed, any suitable sensitizer compound can be included with the polymer in a photoalignment layer of this invention. Such suitable sensitizer compounds and/or components include, photosensitizers, such as, anthracenes, phenanthrenes, chrysenes, benzpyrenes, fluoranthenes, rubrenes, pyrenes, xanthones, indanthrenes, thioxanthen-9-ones, and mixtures thereof. In some exemplary embodiments, suitable sensitizer compounds include 2-isopropyl-9H-thioxanthen-9-one, 4-isopropyl-9H-thioxanthen-9-one, 1-chloro-4-propoxythioxanthone (commercially sold under the name CPTX from Lambson), phenothiazine, and mixtures thereof. Generally, photosensitizers absorb energy from the radiated light source and transfers that energy to the desirable substrate/reactant, which in the present invention are the polymers of this invention.

In some embodiments, the photosensitizer employed with the polymer in a photoalignment layer of this invention without any limitation is selected from the group consisting of:

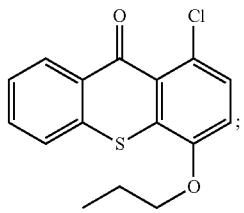

1-chloro-4-propoxy-9H-thioxanthen-
9-one (commercially available as
CPTX from Lambson PLC)

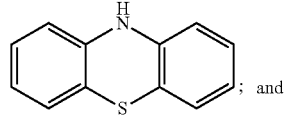
; and 10H-phenothiazine
(Phenothiazine, commercially
available from Kanto)

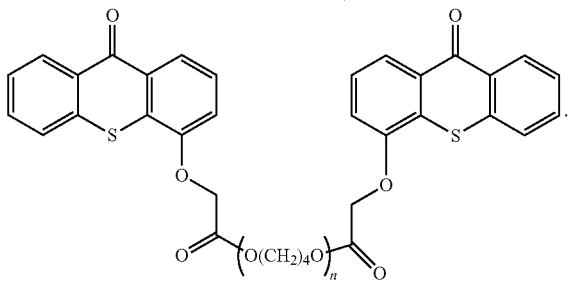

polybutyleneglycol bis-2-((9-oxo-9H-thioxanthen-4-yl)oxy)acetate,
where n = 250

Commercially available as Omnipol TX from IGM Resins.

In a further aspect of this invention there is also provided a method for preparing a photoalignment layer for liquid crystal displays. The method incorporates the following steps. First, coating a surface of a substrate with a composition comprising a polymer, said polymer as described herein. Next, exposing the polymer coated substrate to a linearly polarized electromagnetic radiation so as to form a photoaligned polymer layer.

It should be noted that any one or more of the polymers described herein can be employed to form the photoalignment layer as described herein. Accordingly, in some method embodiments of this invention one or more polymers encompassing one or more of repeating units distinct from each other and each represented by formula (IA) can be employed. In some other method embodiments of this invention one or more polymers encompassing one or more of repeating units distinct from each other and each represented by formula (IA) and one or more repeating units distinct from each other and each represented by formula (IIA) can be employed.

In general, one or more of the polymer as described herein along with any additives, such as photosensitizers as described herein, are dissolved in a suitable solvent to form the photoalignment layer of the present invention. As a solvent, there may be used N-methyl-2-pyrrolidone (NMP), γ-butyrolactone, N,N-dimethylacetamide, dimethylsulfoxide, diethyleneglycol dimethylether, diethyleneglycol diethylether, diethyleneglycol dibutylether, propyleneglycol monomethylether (PGME), dipropylene glycol monomethylether, propyleneglycol monomethylether acetate (PGMEA), methyl lactate, ethyl lactate, butyl lactate, methylethyl ketone (MEK), methyl amyl ketone (MAK), cyclohexanone, tetrahydrofuran, methyl-1,3-butyleneglycolacetate, 1,3-butyleneglycol-3-monomethylether, methylpyruvate, ethyl pyruvate, methyl-3-methoxypropionate or the like. They may be used solely or mixed by optionally selecting two or more kinds.

The polymer solution is then applied onto a desired substrate to form a film. Such a substrate includes any appropriate substrate as is, or may be used for the intended application, for example, a liquid crystal display may include a glass substrate such as float glass or soda glass, or a plastic film of polyesters such as polyethylene terephthalate (PET), polybutylene terephthalate (PBT), polyether sulfone, polycarbonate, and the like. The glass substrate is typically coated with tin oxide ($SnO_2$) or indium tin oxide (ITO—$In_2O_3$—$SnO_2$).

However, other suitably coated substrates can also be employed as is well known to one skilled in the art, particularly, for non-display related optically anisotropic devices, such as for example, optically patternable interference filters, polarizers and optical retarders. With regard to said polymer coating methods, any appropriate coating method can be employed, for example spin coating, spraying, doctor blading, meniscus coating, ink jet coating and slot coating.

Next, the coated substrate is heated to facilitate the removal of residual casting solvent, for example to a temperature from 70° C. to 130° C. for from 1 to 30 minutes, although other appropriate temperatures and times can be used. After the heating, the thickness of the polymer layer (i.e., the film) is measured. It has now been found that polymer layers of various thickness can be formed depending upon the intended application. The thickness of polymer layer can be in the range from 1 nm to 1500 nm or higher. In some embodiments the thickness of the polymer film is at least 2 nm. In some other embodiments the thickness of the polymer film is less than 50 nm. In some other embodiments the thickness of the polymer film is from 3 nm to 30 nm.

Next, the polymer layer is generally exposed to an appropriate wavelength of linearly polarized actinic radiation. As noted, wavelength is generally selected based on the choice of polymer employed and/or photosensitizer, if used. However, generally such appropriate wavelength is from 200 to 700 nm. The exposed substrates are then examined by optical microscopy to determine the photoalignment of the polymer layer. It has further been observed that the photoalignment of the polymer layer depends upon the exposure dose of the actinic radiation. Accordingly, in some embodiments the polymer layers are exposed to a dose of at least 3 J/cm² or higher. In some other embodiments the polymer layers are exposed to a dose of at least 4 J/cm² or higher. In some other embodiments the polymer layers are exposed to a dose of from about 3 J/cm² to 4000 J/cm² or higher. However, any other dosage of radiation can be used so as to obtain an intended effect. In general, higher the thickness of the polymer layer higher the dosage of actinic radiation employed.

In a further aspect of this invention there is also provided a method for preparing a "sandwiched" photoalignment layer for liquid crystal displays comprising the following steps.

First, coating separately a surface of a first substrate and a surface of a second substrate with a composition comprising a polymer as described herein. That is, a polymer encompassing one or more repeating units distinct from each other and each represented by formula (IA), said repeating unit is derived from a corresponding monomer of formula (I) as described herein. The polymer may further encompass one or more repeating units distinct from each other and each represented by formula (IIA), said repeating unit is derived from a corresponding monomer of formula (II). The polymer solution as used herein may further contain other additives such as a photosensitizer as described herein. Again, typically ITO coated glass substrates are employed for this purpose.

In this aspect of the invention the coating can be affected by any of the methods as described herein. Then the coated substrates are heated to facilitate the removal of residual casting solvent, for example, to a temperature from 70° C. to 130° C. for from 1 to 30 minutes, as described herein. After the heating, the thickness of the polymer layer (i.e., the film) is measured. Then, exposing separately the polymer coated first substrate and the polymer coated second substrate to a polarized electromagnetic radiation so as to form a photoaligned polymer layer as described herein.

Figure 2A:
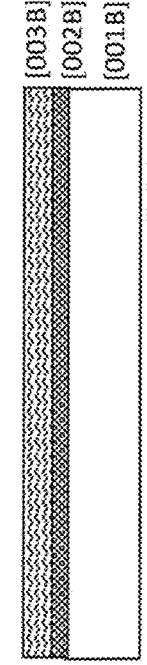
FIG. 2A and FIG. 2B show respectively a polymer as described herein coated onto an ITO coated glass substrate.
Figure 3A:
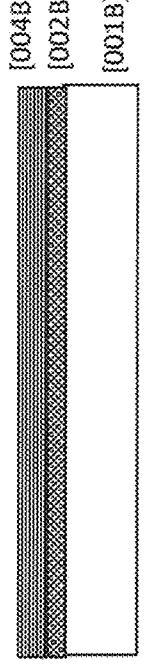
FIG. 3A and FIG. 3B show respectively a photoaligned polymer as described herein on an ITO coated glass substrate.
Figure 1B:
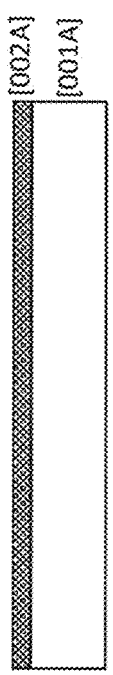
Figure 2B:
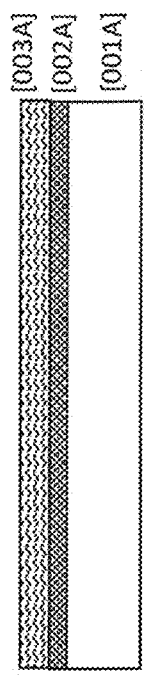
Figure 3B:
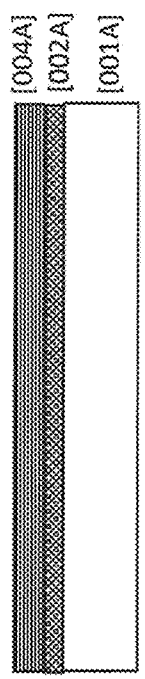

FIG. 1 to FIG. 3 illustrate the method of this invention. FIG. 1A and FIG. 1B show respectively the first and the second glass substrates, [001A] and [001B] coated with indium tin oxide (ITO), [002A] and [002B]. The polymer as described herein is then coated onto these substrates as illustrated respectively in FIG. 2A and FIG. 2B, [003A] and [003B]. Then these two substrates are exposed to appropriate linearly polarized actinic radiation thereby aligning the polymer layer as illustrated respectively in FIG. 3A and FIG. 3B, [004A] and [004B].

Figure 4A:
FIG. 4A shows a strip of glass beads mixed with an adhesive coated on top of a photoaligned polymer as described herein along the long edges of the glass substrate.
Figure 4B:
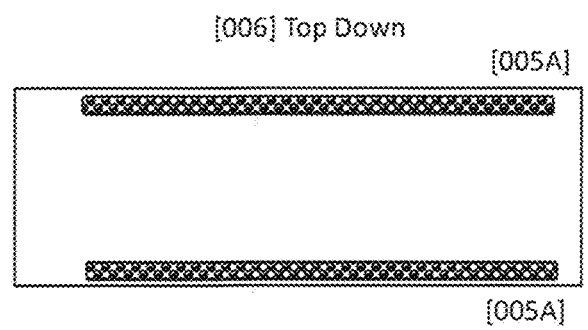
FIG. 4B shows the top down view of the same.

In a further aspect of this invention the method embodiment of this invention further includes the following steps. A strip of glass spacer beads and an adhesive layer is deposited along the long edges of the polymer coated first substrate. That is, as illustrated in FIG. 4A, [005A], a strip of glass beads and adhesive is deposited onto both long edges of first substrate. This is more evident from the top down view of the first substrate as illustrated in FIG. 4B. It is to be understood that the glass beads serve as a spacer or a gap for the liquid crystals to be filled between the first substrate and the second substrate. Any of the glass beads or other materials that can bring this effect can be employed herein. The glass spacer beads are generally of uniform size so as to form a fixed gap between first substrate and the second substrate. In general the dimensions of the spacer beads can be from 1 µm to 20 µm. Accordingly, in some embodiments the mean diameter of spacer beads is from 3 µm to 15 µm. In some other embodiments the mean diameter of spacer beads is from 4 µm to 10 µm. In yet some other embodiments the mean diameter of spacer beads is from 4 µm to 6 µm. The glass beads are generally mixed with an adhesive in order to firmly affix the first substrate with a second substrate. Any of the known adhesives which can cure readily and form a firm bond between first and second glass substrates can be employed for this purpose. Advantageously, it has now been found that any of the known clear, colorless, liquid photopolymer can be used. An example of such an adhesive is tetrahydrofurfuryl mercapto-ester, sold commonly under the tradename of Norland Optical Adhesive 68. However, any of the other known adhesives which would function similarly can be employed.

Figure 5A:
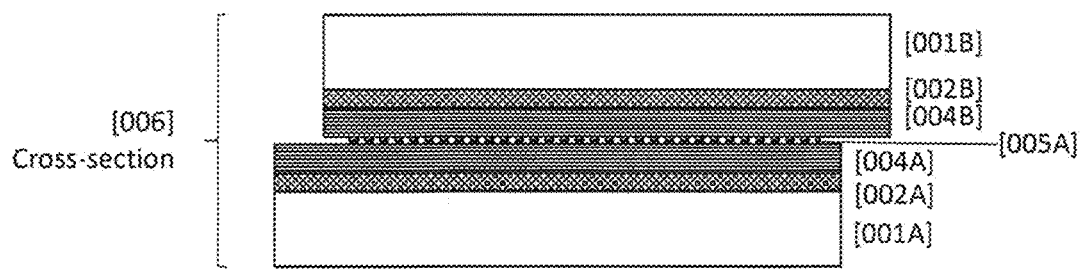
FIG. 5A shows cross-sectional view of the sandwiched glass substrates taken respectively from FIG. 4A and FIG. 3B.
Figure 5B:
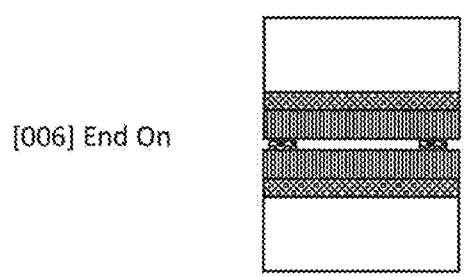
FIG. 5B shows the end-on view of the same.

Next, the second polymer coated substrate is placed directly over the first substrate such that the second substrate is directly in contact with the adhesive layer on the long edges, and the polymer coated surface of first substrate and the polymer coated surface of the second substrate are directly facing each other so as to form a gap between the polymer coated first substrate and the polymer coated second substrate. This is further illustrated in FIG. 5A, which shows the cross-sectional view, [006], of the first and the second substrates as described herein. FIG. 5B shows end-on view, [006], of the glass substrates where the gap between the first substrate and the second substrate is clearly evident. As noted, the gap between the first and second substrates can be varied based on the size of the glass beads employed. Accordingly, in some embodiments the gap between the substrates, termed cell gap, can range from 1 µm to 20 µm. In some other embodiments the cell gap is less than 5 µm. In some other embodiments the cell gap is between 2 µm to 15 µm. In some other embodiments the cell gap is between 2 µm to 3 µm.

Then, the gap between the first substrate and the second substrate is masked by a suitable material which is not affected by the actinic radiation and impenetrable to the actinic radiation, i.e., actinic radiation does not pass through such masking material. Exemplary masking material includes a metal foil or a radiation resistant and radiation impermeable polymeric sheet, and the like. It should be understood that the masking is important in order to preserve the photoaligned structure of the polymer layer coated on the first and the second substrate.

Finally, the first and second substrates are exposed to an appropriate electromagnetic radiation in order to cure the adhesive and to fix the gap between the first and the second substrate. Any of the actinic radiation that can bring about curing of the adhesive can be employed herein. In general, the substrates are exposed to ultraviolet radiation at around 240 nm 370 nm for a sufficient length of time to accomplish this curing step.

Figure 6A:
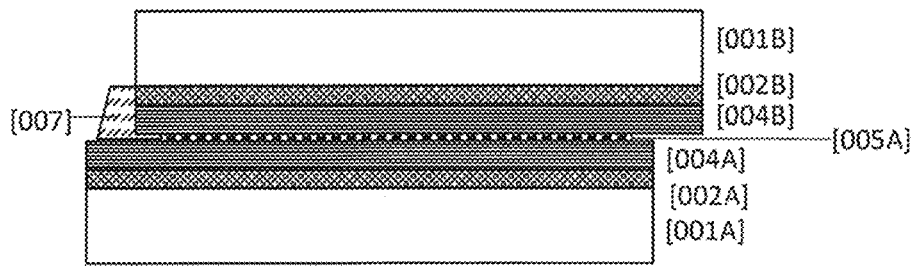
FIG. 6A shows cross-sectional view of the sandwiched glass substrates as shown in FIG. 5A in which the gap between the substrates have been filled with liquid crystals.
Figure 6B:
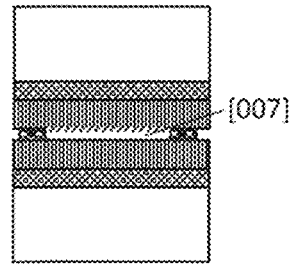
FIG. 6B shows the end-on view of the same.

After the curing step the masking layer is removed and the gap between the first and the second substrate is filled with a liquid crystal. Any of the methods that will allow to fill the liquid crystal into the gap can be employed at appropriate conditions. For example, commonly used liquid crystal, such as for example, 5-cyano-4'-pentylbiphenyl (5CB) can be filled into the gap at an isotropic temperature of about 35° C. to 80° C. However any of other temperature conditions higher than 80° C. can also be employed. It should be understood that the liquid crystal is filled in such a manner that the liquid crystal is placed parallel to the photoaligned polymeric layer. That is, it should be ensured that the flow of the liquid crystal while filling the gap is in the direction parallel to the polarized exposure of the polymer layers. In some embodiments the liquid crystal is filled at a temperature from 40° C. to 60° C. After filling of the liquid crystal the first and the second substrate, termed a cell, is allowed to cool slowly, typically at a rate of 1° C./min. This is illustrated in FIG. 6A, which shows cross-sectional view of the cell, [008], with a liquid crystal, [007], filled in the direction of the photoaligned polymer layers, [004A] and [004B]. FIG. 6B shows the end-on view of the cell, [008].

In another aspect of this invention there is further provided a method for preparing a photoalignment layer for liquid crystal displays comprising coating separately a surface of a first substrate and a surface of a second substrate with a composition comprising a polymer as described herein. Typically the substrates are first coated with a transparent conductive film and is patterned appropriately before applying the polymer coating as described herein. A photo-etching technique or masking technique is used for the patterning of this transparent conductive film. More specifically, the substrates as used in this method are typically patterned ITO coated glass substrates, however, any of the other appropriate substrates depending upon the intended application can be used herein. Then, the polymer coated first substrate and the polymer coated second substrate are exposed to a polarized electromagnetic radiation so as to form a photoaligned polymer layer as described herein. Next, along the long edges of the polymer coated first substrate a strip of glass beads and an adhesive layer is deposited as described herein. Then the second polymer coated substrate is placed over the first substrate such that the second substrate is directly in contact with the adhesive layer on the long edges, and the polymer coated surface of first substrate and the polymer coated surface of the second substrate are directly facing each other so as to form a gap between said polymer coated first substrate and said polymer coated second substrate. The gap between the first substrate and the second substrate is masked by a material impenetrable to actinic radiation. The entire cell encompassing the first and second substrates are then exposed to an electromagnetic radiation in order to cure the adhesive and to fix the gap between the first and the second substrate. Finally, the gap between the first and the second substrate is filled with a liquid crystal in such a manner that the liquid crystal is placed parallel to the photoaligned polymeric layer to form a liquid crystal display cell.

In yet another aspect of this invention there is also provided a liquid crystal display device comprising a first and a second substrate coated with a photoaligned polymer layer, wherein the polymer used is any of the polymer as described herein and a liquid crystal disposed between the first and the second substrate directly in contact with the photoaligned polymer layers. In certain embodiments the liquid crystal display device of this invention encompasses a polymer, which is a homopolymer derived from a monomer of formula:

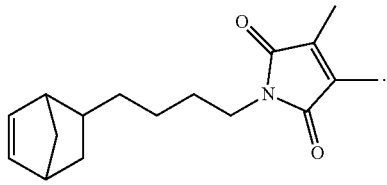

1-(4-bicyclo[2.2.1]hept-5-en-2-yl)butyl)-3,4-dimethyl-1H-pyrrole-2,5-dione (BuDMMINB)

In some embodiments the liquid crystal display device of this invention encompasses a polymer wherein the thickness of the first and second photoaligned polymer layer is at least 3 nm.

This invention is further illustrated by the following examples which are provided for illustration purposes and in no way limit the scope of the present invention.

Examples (General)

The following definitions have been used in the Examples that follow unless otherwise indicated:
BuDMMINB: 1-(4-(bicyclo [2.2.1]hept-5-en-2-yl)butyl)-3,4-dimethyl-1H-pyrrole-2,5-dione;
PGMEA: propylene glycol monomethyl ether acetate;
HDPE: —high density polyethylene;
PTFE: polytetrafluoroethylene; Omnipol TX: polybutyleneglycol bis-2-((9-oxo-9H-thioxanthen-4-yl)oxy)acetate, where n=250; 5CB: 5-cyano-4'pentyl-biphenyl [Chemical Abstract No.: 40817-08-1]; ITO; indium tin oxide; $M_w$: weight average molecular weight; PDI: polydispersity index; pphr: parts per hundred parts resin (i.e., polymer); ms: millisecond.

Polymers

The polymers used to form the photoaligned layers of this invention are generally known in the literature and are prepared in accordance with the well-known literature procedures. See for example, U.S. Pat. Nos. 9,175,123 B2 and 9,341,949 B2.

Example 1

Spin Coating Procedure—Polymer Alone

Poly(BuDMMINB) ($M_w$=138,000, PDI=3) was dissolved in PGMEA to the appropriate weight percent to achieve the targeted film thickness during spin-coating. After the polymer dissolved, the polymer solution was filtered through a 0.2 μm PTFE syringe filter into a brown, HDPE, low particulate bottle. Various coatings with different polymer thickness were achieved first by spinning at a spin speed of 500 rpm for 10 seconds and at various speeds for 30 seconds as summarized in Table 1. Also summarized in Table 1 are weight percent of the polymer solution in PGMEA and the film thickness of the coated film formed under each of these conditions.

TABLE 1

| Weight % in PGMEA | 500 rpm/10 sec + (x) rpm/30 sec | Film Thickness Range (nm) |
|---|---|---|
| 0.1 | 2000 | 1-20 |
| 0.5 | 2000 | 10-30 |
| 1.5 | 2000 | 40-50 |
| 3.1 | 2100 | 80-100 |
| 5.0 | 1000 | 250-300 |
| 8.0 | 1400 | 450-500 |
| 10.7 | 1400 | 1000-1100 |

Example 2

Spin Coating Procedure—Polymer with Photosensitizer

The procedures of Example 1 were substantially repeated in this Example 2 except that 0.8 pphr Omnipol TX photosensitizer was added to the polymer solution in order to form the polymer layers of this invention.

Example 3

Cell Fabrication and Characterization of Liquid Crystal Alignment Via Polarized Optical Microscopy To a pair of ITO coated (250 Å; 80-100Ω/□) soda-lime glass slides (approximate dimensions of 1.5"×2"), FIG. 1A and FIG. 1B, where respectively [001A] and [001B] are the glass surface and [002A] and [002B] are the ITO surface, approximately 2 mL of a 0.5 wt. % poly(BuDMMINB) solution in PGMEA was spin-coated onto the ITO side of the glass slide at 500 rpm/10 sec+2000 rpm/30 sec using a 0.20 μm Nylon filter at the point-of-use. The polymer coated glass slides were then baked at 120° C. for 3 min. The polymer film thickness was estimated to be ~30 nm thick using a J. A. Woollam M2000V spectroscopic ellipsometer. See FIG. 2A and FIG. 2B, where [003A] and [003B] are respectively the unaligned polymer layer. Next, the pair of polymer coated glass substrates were exposed to 4 J/cm$^2$ of linearly polarized light by using a Newport precision linear polarizer (model: 20LP-UV) aligned parallel with the long edge of the glass slide. See FIG. 3A and FIG. 3B, where [004A] and [004B] are respectively the photoaligned polymer layer.

A blend of 5 μm glass spacer beads, 4 wt. % in Norland Optical Adhesive 68 was deposited on both long edges of the polymer side of one glass slide, i.e., FIG. 4A, [005A]. FIG. 4B shows the top down view of the same, [006]. The other glass slide was placed against the beads of adhesive to make a sandwich of glass:ITO:polymer:5 μm adhesive spacer:ITO:polymer:glass. See FIGS. 5A and 5B; where FIG. 5A shows the cross-sectional view, [006], of the sandwiched pair of glasses; and FIG. 5B shows end-on view, [006], of the same. Regions not containing adhesive were masked, and while held together under pressure, the adhesive regions were exposed to 5.4 mW/cm$^2$ of ultraviolet light for 2 min to cure the adhesive and fix a gap between the two glass slides. Next, 5-cyano-4'pentyl-biphenyl [40817-08-1] (5CB) liquid crystal was used to fill the spacer gap at isotropic temperatures of 40-50° C. with flow in the direction parallel to the polarized exposure. After filling, the cell containing 5CB was allowed to cool at a rate of ~1° C./min. See FIGS. 6A and 6B; where FIG. 6A shows the cross-sectional view, [008], of the liquid crystal filled sandwiched pair of glasses; and FIG. 6B shows end-on view, [008], of the same. After a set of cross-polarizers was mounted to the outside of the assembled liquid crystal cell, it was transferred to an Olympus BX-51 polarizing optical microscope. Images were taken as a function of the angle between the polarizer and analyzer using a Hitachi CCD camera and a fabricated LabVIEW image acquisition software as shown in FIG. 7. When the angle (φ) between the polarizer and analyzer is 90° (FIG. 8A), a black image indicates that the 5CB liquid crystals are aligned. When the angle is adjusted to 45° (FIG. 8B), a bright image also indicates alignment of the 5CB liquid crystals.

Example 4

Figure 9:
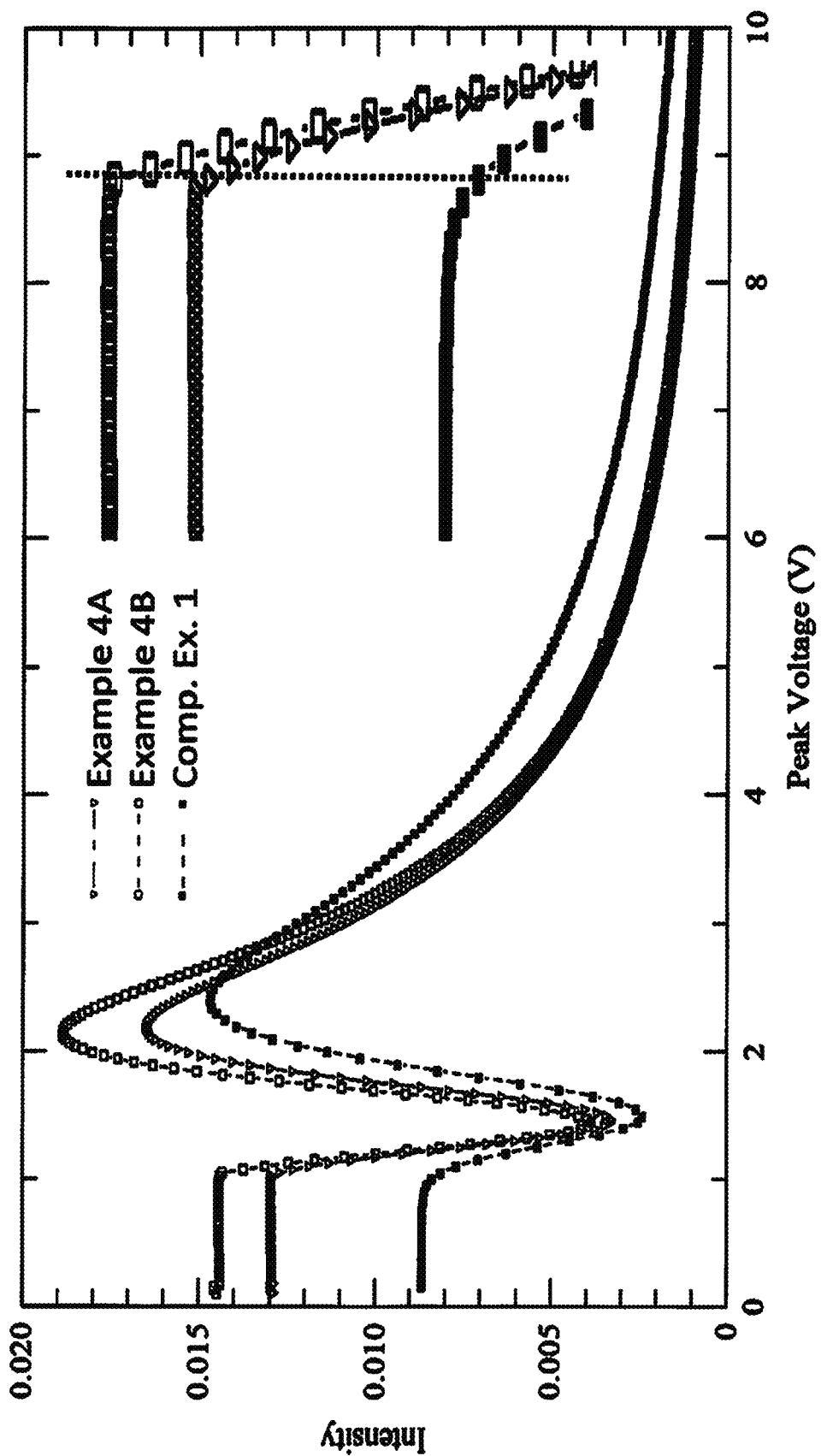
FIG. 9 shows graphical relationship between intensity of radiation versus peak voltage used to measure the pretilt angle of the liquid crystal.

Cell Fabrication and Characterization of Surface, Pretilt Angle, Surface Anchoring Energy, and 5CB Switching Time Poly(BuDMMINB) solution in PGMEA (0.5 wt. %, 7 mL) was applied via spin-coating (500 rpm/10 sec+2000 rpm/30 sec) to two 7"×7" soda-lime glass panels patterned with ITO (1×1 cm electrode with appropriate leads; 250 Å; 80-100Ω/□) using a 0.20 μm Nylon filter at the point-of-use. The glass panels were baked at 120° C. for 3 min. The film thickness was estimated to be ~20 nm thick using a J. A. Woollam M2000V spectroscopic ellipsometer. The glass panels were cut to produce individual ITO patterned soda-lime glass slides (approximate dimensions of 1.5"×2"). After baking to remove solvent, the pair of polymer coated glass slides were exposed to 3 J/cm$^2$ of linearly polarized light by using a Newport precision linear polarizer (model: 20LP-UV) polarized filter aligned parallel with the long edge of the glass slide. A blend of 5 μm glass spacer beads in Norland Optical Adhesive 68 was deposited on both long edges of the polymer side of one glass slide. The other glass slide was placed against the beads of adhesive to make a sandwich of glass:patterned-ITO:polymer:5 μm adhesive spacer:patterned-ITO:polymer:glass. While held together under pressure, the adhesive was exposed to light to cure the adhesive and fix a gap between the two glass slides. Next, 5CB was used to fill the spacer gap at isotropic temperatures of 40-50° C. with flow in the direction parallel to the photo induced alignment. After filling, the cell containing 5CB was allowed to cool at a rate of ~1° C./min. The sandwiched cell containing 5CB was transferred to a device comprising an Agilent Keysight 33120A function generator and a photo diode as well as LabVIEW acquisition software where intensity was measured as a function of peak voltage to assess the pretilt angle of the 5CB liquid crystals. Pretilt is the angle of the easy axis (the direction the LC molecules would like to align) with respect to the substrate. It can be determined by the sharpness of the Fredericks transition. A sharper transition is indicative of a smaller pretilt angle. This cell was designated as Example 4A. Another cell containing the sandwiched glass slides was similarly prepared but was exposed to a dosage of 4 J/cm$^2$ of linearly polarized light and the pretilt angle was measured, this cell was designated as Example 4B. Another pair of cells was similarly prepared in which the polymer layer had a thickness of 30 nm and each cell was exposed respectively to 3 and 4 J/cm$^2$ of linearly polarized light and the pretilt angle was measured in each case, designated as Examples 4C and 4D respectively. Similarly, a sample cell was made in accordance with the Comparative Example 1, and its pretilt angle was similarly measured. The results are shown in FIG. 9 (only Examples 4A and 4B with Comparative Example 1 are displayed) and summarized in Table 2. It is apparent from these results that the LCD cells formed in accordance with this invention feature remarkably sharper transition, whereas the LCD cell of the Comparative Example 1 does not feature similar sharp transition.

A separate set of four cells prepared similarly were transferred individually to the Keysight function generator coupled with the polarized optical microscope to determine polar surface anchoring energy, W, $$\text{from} = \frac{V_{sat}}{2d}\sqrt{\Delta\varepsilon \cdot \varepsilon_o K_1}.$$

Figure 10:
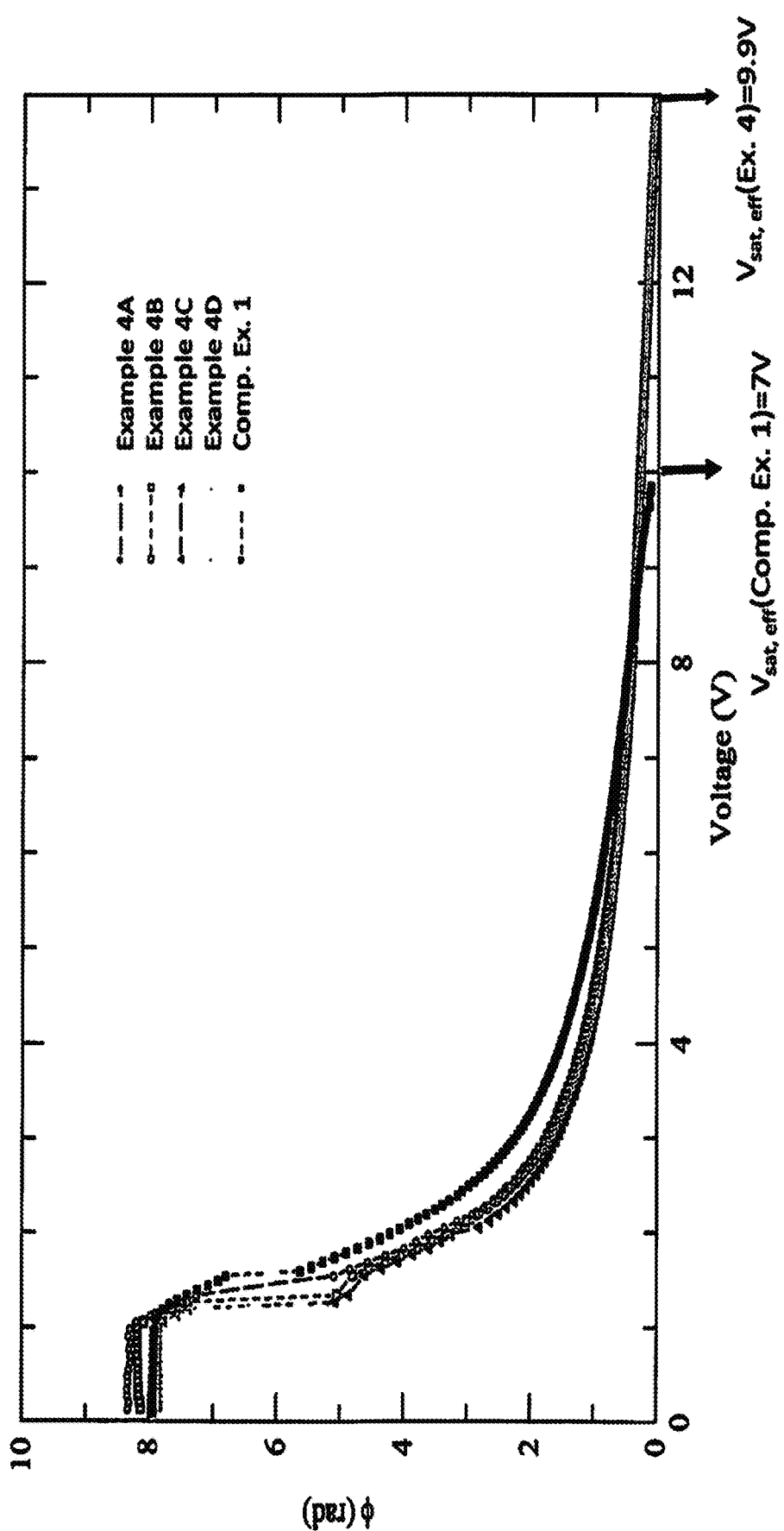
FIG. 10 shows graphical relationship used to determine the surface anchoring energy needed for the liquid crystals to be removed from the direction away from the easy axis.

Surface anchoring determines energy per unit area that is needed to supply to remove the direction away from the easy axis. Two cells contained a polymer layer of thickness 20 nm and the other two cells had a polymer layer of 30 nm thickness. Each pair of cells was exposed to two different exposure dosages of respectively 3 and 4 J/cm$^2$ of linearly polarized light as described above. The results are shown in FIG. 10 which is compared with the cell formed in accordance with the procedures of Comparative Example 1. The results are summarized in Table 2. It is again evident that the cell formed from Comparative Example 1 required less energy to remove the direction away from the easy axis than the LCD cells fabricated according to the photoaligned polymer layers of this invention: $1.54 \times 10^{-5}$ J/m$^2$ for the polyimide film of Comparative Example 1 versus $2.2 \times 10^{-5}$ J/m$^2$ for the photoaligned polymers of the present invention, also see Table 2.

Figure 11:
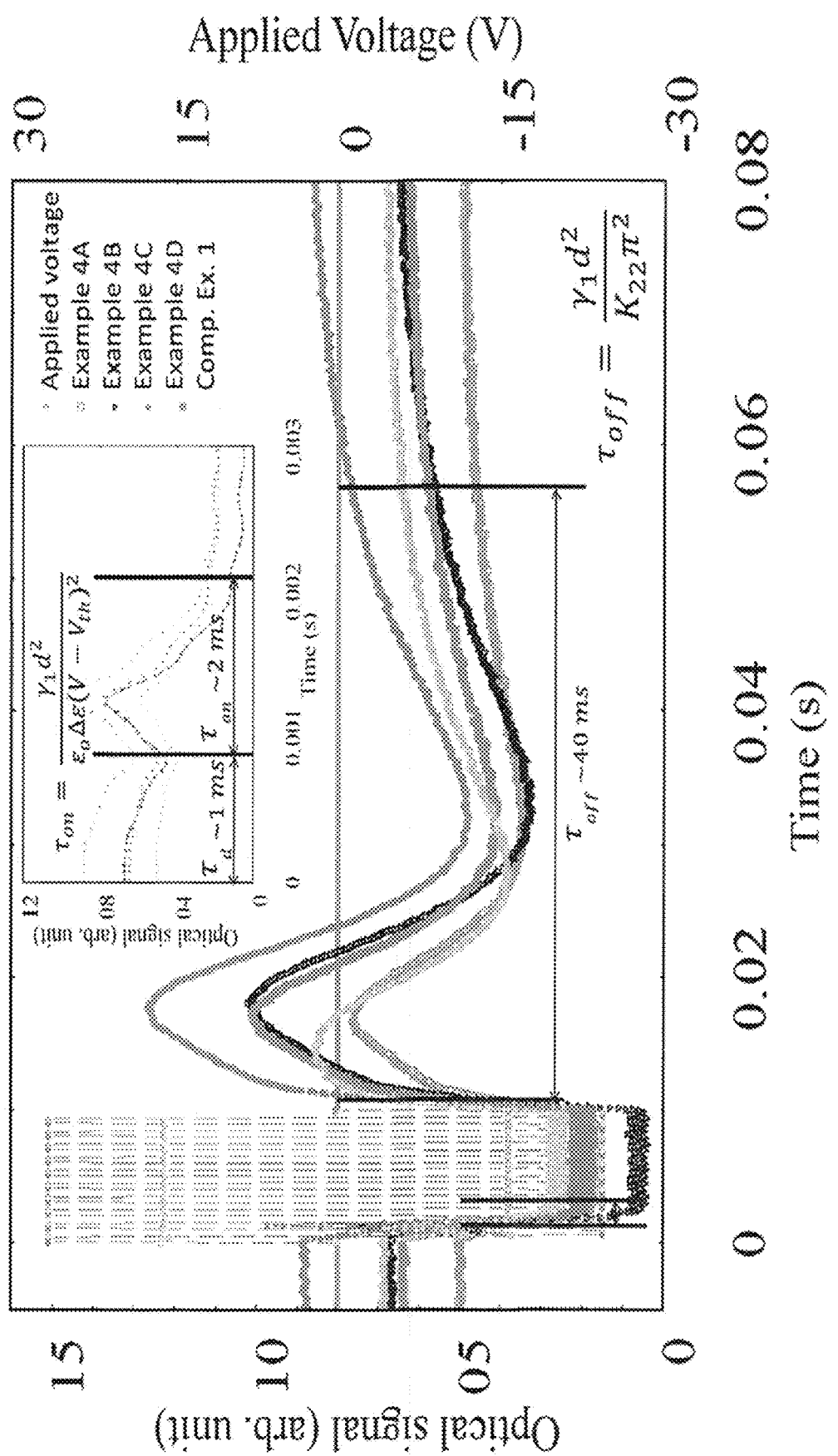
FIG. 11 shows graphical relationship between optical signal versus time needed to determine the liquid crystal switching time.

Another set of four cells were prepared similarly and transferred to the Keysight function generator coupled with Agilent Keysight InfiniVision 3000A X-Series oscilloscope to measure the ON-OFF switching time of the 5CB by measuring the optical signal vs time while applying alternating current. When the dielectric anisotropy is positive, as is the case with 5CB, $\tau_{on}$ is the time required to turn the director along the electric field. FIG. 11 shows the results obtained for the four different cells, which is compared with the cell formed from the Comparative Example 1. This again demonstrates the superior property obtained from the practice of this invention.

Comparative Example 1

Polyimide Reference Cell Fabrication

HD Micro Polyimide (PI) 2555 was applied via spin-coating to two 7"×7" soda-lime glass panels patterned with ITO (1×1 cm electrode with appropriate leads; 250 Å; 80-100Ω/☐). After baking to remove solvent, the PI was mechanically rubbed to induce alignment of liquid crystals via the traditional method. The glass panels were cut to produce individual ITO patterned soda-lime glass slides (approximate dimensions of 1.5"×2"). A blend of 5 μm glass spacer beads in Norland Optical Adhesive 68 (repeat from above) was deposited on both long edges of the polymer side of one glass slide. The other glass slide was placed against the beads of adhesive to make a sandwich of glass:patterned-ITO:polymer:5 μm adhesive spacer: patterned-ITO:polymer:glass. While held together under pressure, the adhesive was exposed to light (repeat from above) to cure the adhesive and fix a gap between the two glass slides. Next, 5CB was used to fill the spacer gap at isotropic temperatures of 40-50° C. with flow in the direction parallel to the mechanical rubbing. After filling, the cell containing 5CB was allowed to cool at a rate of ~1° C./min. The sandwiched cell containing 5CB was transferred to a device comprising an Agilent Keysight 33120A function generator and a photo diode as well as LabVIEW acquisition software where intensity was measured as a function of peak voltage to assess the pretilt angle of the 5CB liquid crystals, which is shown in FIG. 9 and results summarized in Table 2.

A separate cell prepared similarly was transferred to the Keysight function generator couple with the polarized optical microscope to determine polar surface anchoring energy, W, $$\text{from} = \frac{V_{sat}}{2d}\sqrt{\Delta\varepsilon \cdot \varepsilon_o K_1},$$

which is shown in FIG. 10 and results summarized in Table 2.

Another cell was prepared similarly and transferred to the Keysight function generator coupled with Agilent Keysight InfiniVision 3000A X-Series oscilloscope to measure the ON-OFF switching time of the 5CB by measuring the optical signal vs time while applying alternating current. When the dielectric anisotropy is positive, as is the case with 5CB, $\tau_{on}$ is the time required to turn the director along the electric field. The results are shown in FIG. 11 and summarized in Table 2.

TABLE 2

| Cell Description ID | PAL Thickness (nm) | Polarized Exposure Dosage (mJ/cm$^2$) | Surface Anchoring Energy (J/m$^2$) | Pretilt Angle (degrees) | LC Switching Time (ms) |
|---|---|---|---|---|---|
| Example 4A | 20 | 3000 | $2.2 \times 10^{-5}$ | <<1° | 40 |
| Example 4B | 20 | 4000 | | | |
| Example 4C | 30 | 3000 | | | |
| Example 4D | 30 | 4000 | | | |
| Comparative Example 1 | | rubbed | $1.54 \times 10^{-5}$ | 2-3° | 40 |

PAL—photoaligned layer; ms—millisecond.

Example 5

The procedures of Example 3 were substantially repeated in this Example 5 except that various different thickness of polymer layer and different exposure dosages were employed in each of the cells that were examined. The alignment of liquid crystals were measured by optical microscopy, the degree of alignment of the liquid crystals were qualitatively measured and assigned the following ratings: excellent (>90%), good (70-90%), insufficient (30-70%) and poor (<30%). The results are summarized in Table 3.

TABLE 3

| Cell Description ID | PAL Thickness (nm) | Polarized Exposure Dosage (mJ/cm$^2$) | LC's Alignment |
|---|---|---|---|
| 1 | 50 | 300 | poor |
| 2 | 50 | 3000 | good |
| 3 | 50 | 0 | poor |
| 4 | 100 | 300 | poor |
| 5 | 100 | 3000 | good |
| 6 | 100 | 0 | poor |
| 7 | 500 | 300 | homeotropic |
| 8 | 500 | 3000 | pattern |
| 9 | 500 | 0 | |
| 10 | 50 | 2000 | good |
| 11 | 50 | 3000 | good |
| 12 | 50 | 4000 | excellent |
| 13 | 30 | 2000 | good |
| 14 | 30 | 3000 | good |
| 15 | 30 | 4000 | excellent |
| 16 | 20 | 2000 | good |
| 17 | 20 | 3000 | good |
| 18 | 20 | 4000 | excellent |
| 19 | 20 | 3000 | poor |
| 20 | 50 | 4000$^a$ | good |
| 21 | 30 | 4000$^a$ | excellent |
| 22 | 1000 | 2000 | good |
| 23 | 1000 | 3000 | good |
| 24 | 1000 | 0 | good |

$^a$24 hr Anneal;

Example 6

The procedures of Example 3 were substantially repeated in this Example 6 except that a photosensitizer, 0.8 pphr of Omnipol TX was used along with the polymer as described in Example 2. The cells were made with various different thickness of polymer layer and different exposure dosages were employed in each of the cells that were examined. The alignment of liquid crystals were measured by optical microscopy, the degree of alignment of the liquid crystals were qualitatively measured and assigned the following ratings: excellent (>90%), good (70-90%), insufficient (30-70%) and poor (<30%). The results are summarized in Table 4.

TABLE 4

| Cell Description ID | PAL Thickness (nm) | Polarized Exposure Dosage (mJ/cm$^2$) | LC's Alignment |
|---|---|---|---|
| 1 | 1000 | 2000 | poor |
| 2 | 1000 | 3000 | poor |
| 3 | 1000 | 4000 | poor |
| 4 | 20 | 2000 | poor |
| 5 | 20 | 3000 | poor |
| 6 | 20 | 4000 | poor |
| 7 | 30 | 2000 | insufficient |
| 8 | 30 | 3000 | good |
| 9 | 30 | 4000 | good |
| 10 | 50 | 2000 | good |
| 11 | 50 | 3000 | good |
| 12 | 50 | 4000 | good |

Comparative Example 2

Exposure to Unpolarized Light without Photosensitizer

The procedures of Example 3 were substantially repeated in this Comparative Example 2 except that various different thickness of polymer layer and different exposure dosages were employed in each of the cells that were examined and were exposed to unpolarized light without any photosensitizer. The alignment of liquid crystals were measured by optical microscopy, the degree of alignment of the liquid crystals were qualitatively measured and assigned the following ratings: excellent (>90%), good (70-90%), insufficient (30-70%) and poor (<30%). The results are summarized in Table 5.

TABLE 5

| Cell Description ID | PAL Thickness (nm) | Unpolarized Exposure Dosage (mJ/cm$^2$) | LC's Alignment |
|---|---|---|---|
| 1 | 100 | 300 | poor |
| 2 | 100 | 3000 | poor |
| 3 | 300 | 1650 | poor |
| 4 | 500 | 300 | poor |
| 5 | 500 | 3000 | insufficient |
| 6 | 500 | 0 | poor |
| 7 | 50 | 3000 | poor |
| 8 | 30 | 3000 | poor |
| 9 | 1000 | 3000 | poor |

Comparative Example 3

Exposure to Unpolarized Light without Photosensitizer

The procedures of Example 3 were substantially repeated in this Comparative Example 3 except that a photosensitizer, 0.8 pphr of Omnipol TX was used along with the polymer as described in Example 2. The cells were made with various different thickness of polymer layer and different exposure dosages were employed in each of the cells that were examined and were exposed to unpolarized light. The alignment of liquid crystals were measured by optical microscopy, the degree of alignment of the liquid crystals were qualitatively measured and assigned the following ratings: excellent (>90%), good (70-90%), insufficient (30-70%) and poor (<30%). The results are summarized in Table 6.

TABLE 6

| Cell Description ID | PAL Thickness (nm) | Unpolarized Exposure Dosage (mJ/cm$^2$) | LC's Alignment |
|---|---|---|---|
| 1 | 1000 | 3000 | poor |
| 2 | 20 | 3000 | poor |
| 3 | 30 | 3000 | poor |
| 4 | 50 | 3000 | poor |

Although the invention has been illustrated by certain of the preceding examples, it is not to be construed as being limited thereby; but rather, the invention encompasses the generic area as hereinbefore disclosed. Various modifications and embodiments can be made without departing from the spirit and scope thereof.

What is claimed is:

1. A photoalignment layer comprising a polymer, said polymer comprising one or more repeating units distinct from each other and each represented by formula (IA), said repeating unit is derived from a corresponding monomer of formula (I):

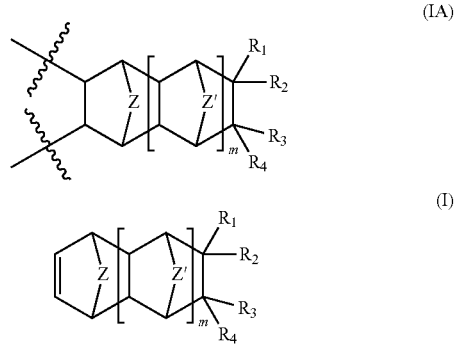

wherein:

∿ represents a position at which the bonding takes place with another repeat unit;

Z and Z' are the same or different and independently of each other selected from the group consisting of —CH$_2$—, —CH$_2$—CH$_2$— and —O—;

m is an integer from 0 to 5;

at least one of R$_1$, R$_2$, R$_3$ or R$_4$ is selected from the group consisting of:

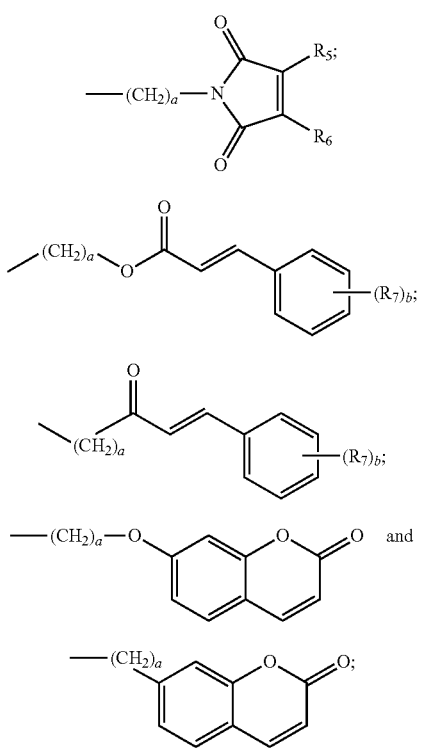

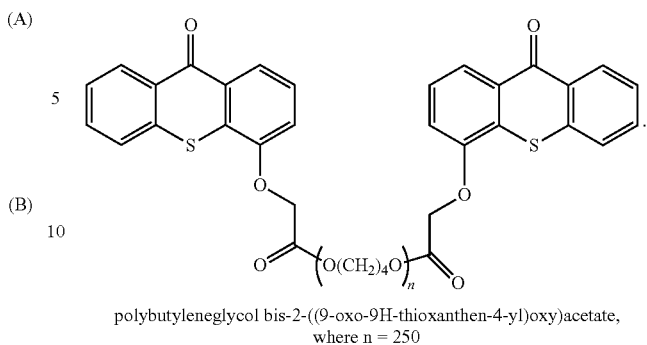

polybutyleneglycol bis-2-((9-oxo-9H-thioxanthen-4-yl)oxy)acetate, where n = 250 wherein:

a is an integer from 1 to 12;

b is an integer from 1 to 4;

$R_5$ and $R_6$ are each independently of one another selected from the group consisting of hydrogen, methyl, ethyl and linear or branched $(C_3$-$C_4)$alkyl; or $R_5$ and $R_6$ taken together with the carbon atoms to which they are attached form a substituted or unsubstituted $(C_5$-$C_8)$cyclic ring;

$R_7$ is selected from the group consisting of methyl, ethyl, linear or branched $(C_3$-$C_4)$alkyl, methoxy, ethoxy, linear or branched $(C_3$-$C_4)$alkoxy, $(C_6$-$C_{10})$aryl and $(C_6$-$C_{10})$aryloxy;

the remaining $R_1$, $R_2$, $R_3$ and $R_4$ are the same or different and independently of each other selected from the group consisting of hydrogen, halogen, methyl, ethyl, a fluorinated or perfluorinated methyl or ethyl, linear or branched substituted or unsubstituted $(C_3$-$C_{12})$alkyl, substituted or unsubstituted $(C_1$-$C_6)$alkoxy, substituted or unsubstituted $(C_3$-$C_8)$cycloalkyl, substituted or unsubstituted $(C_7$-$C_{12})$bicycloalkyl and substituted or unsubstituted $(C_7$-$C_{12})$tricycloalkyl, substituted or unsubstituted $(C_1$-$C_{12})$alkyl$(C_3$-$C_8)$cycloalkyl, substituted or unsubstituted $(C_6$-$C_{10})$aryl and substituted or unsubstituted $(C_1$-$C_{12})$alkyl$(C_6$-$C_{16})$aryl where said substituents are selected from halogen, hydroxy, $(C_1$-$C_6)$alkyl, $(C_1$-$C_6)$alkoxy, $(C_2$-$C_6)$alkenyl, $(C_3$-$C_8)$cycloalkyl, $(C_7$-$C_{12})$bicycloalkyl, $(C_1$-$C_6)$alkoxy$(C_3$-$C_6)$alkyl, $(C_1$-$C_6)$alkoxy$(C_3$-$C_8)$cycloalkyl or $(C_1$-$C_6)$alkoxy$(C_7$-$C_{12})$bicycloalkyl; and said photoalignment layer further comprising a photosensitizer of the formula:

2. The photoalignment layer of claim 1, wherein the polymer further comprising one or more repeating units distinct from each other and each represented by formula (IIA), said repeating unit is derived from a corresponding monomer of formula (II):

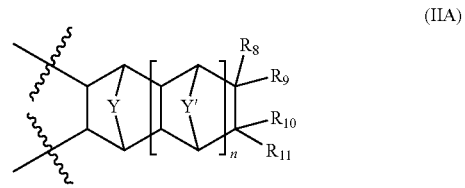

(IIA)

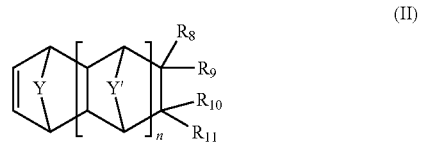

(II)

wherein

⌇⌇⌇ represents a position at which the bonding takes place with another repeat unit;

n is an integer from 0 to 3;

Y and Y' are the same or different and independently of each other selected from the group consisting of —$CH_2$—, —$CH_2$—$CH_2$— and —O—;

$R_8$, $R_9$, $R_{10}$ and $R_{11}$ are the same or different and independently of each other selected from the group consisting of hydrogen, methyl, ethyl, a fluorinated or perfluorinated methyl or ethyl, a linear or branched substituted or unsubstituted $(C_3$-$C_{25})$hydrocarbyl group, substituted or unsubstituted $(C_1$-$C_{25})$heterohydrocarbyl group, substituted or unsubstituted $(C_3$-$C_{25})$ cyclic hydrocarbyl group, substituted or unsubstituted $(C_6$-$C_{25})$polycyclic hydrocarbyl group, substituted or unsubstituted $(C_3$-$C_{25})$cyclic heterohydrocarbyl group and substituted or unsubstituted $(C_6$-$C_{25})$polycyclic heterohydrocarbyl group.

3. The photoalignment layer of claim 1, wherein m is 0 or 1.

4. The photoalignment layer of claim 1, wherein said repeating unit is derived from a monomer of the formula ($IA_1$):

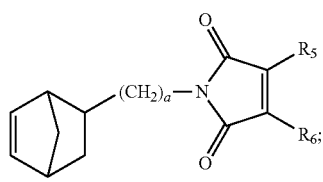

(IA₁)

wherein:

a is an integer from 1 to 12; and

R₅ and R₆ are each independently of one another selected from the group consisting of hydrogen, methyl and ethyl.

5. The photoalignment layer of claim 1, wherein said repeating unit is derived from a monomer selected from the group consisting of:

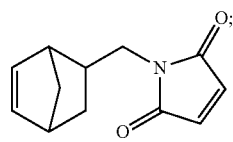

1-(bicyclo[2.2.1]hept-5-en-2-ylmethyl)-1H-pyrrole-2,5-dione

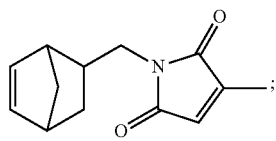

1-(bicyclo[2.2.1]hept-5-en-2-ylmethyl)-3-methyl-1H-pyrrole-2,5-dione

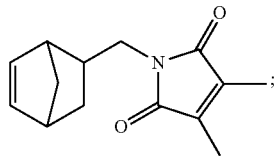

1-(bicyclo[2.2.1]hept-5-en-2-ylmethyl)-3,4-dimethyl-1H-pyrrole-2,5-dione

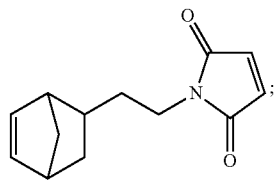

1-(2-(bicyclo[2.2.1]hept-5-en-2-yl)ethyl)-1H-pyrrole-2,5-dione

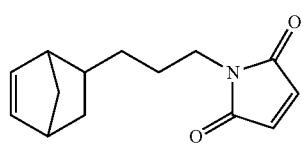

1-(3-(bicyclo[2.2.1]hept-5-en-2-yl)propyl)-1H-pyrrole-2,5-dione

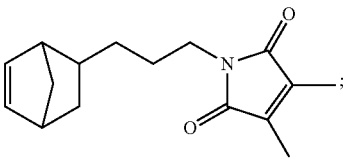

1-(3-(bicyclo[2.2.1]hept-5-en-2-yl)propyl)-3,4-dimethyl-1H-pyrrole-2, 5-dione

-continued

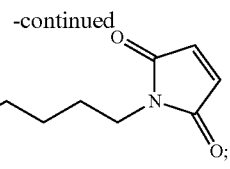

1-(4-(bicyclo[2.2.1]hept-5-en-2-yl)butyl)-1H-pyrrole-2,5-dione

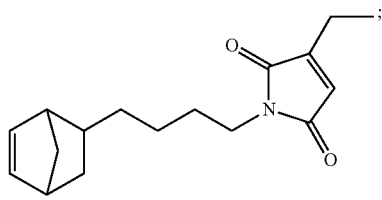

1-(4-(bicyclo[2.2.1]hept-5-en-2-yl)butyl)-3-methyl-1H-pyrrole-2,5-dione

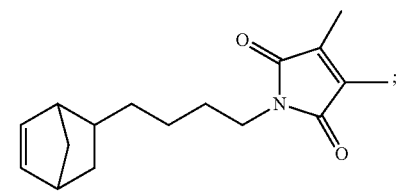

1-(4-(bicyclo[2.2.1]hept-5-en-2-yl)butyl)-3-ethyl-1H-pyrrole-2,5-dione

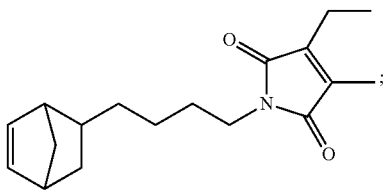

1-(4-(bicyclo[2.2.1]hept-5-en-2-yl)butyl)-3,4-dimethyl-1H-pyrrole-2, 5-dione

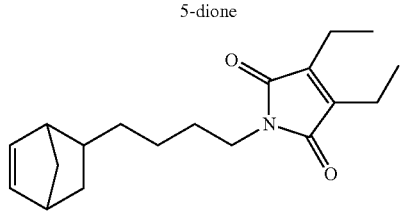

1-(4-(bicyclo[2.2.1]hept-5-en-2-yl)butyl)-3-ethyl-4-methyl-1H-pyrrole-2, 5-dione

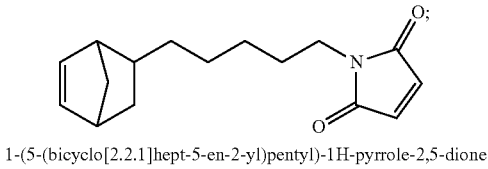

1-(4-(bicyclo[2.2.1]hept-5-en-2-yl)butyl)-3,4-diethyl-1H-pyrrole-2, 5-dione 1-(5-(bicyclo[2.2.1]hept-5-en-2-yl)pentyl)-1H-pyrrole-2,5-dione -continued

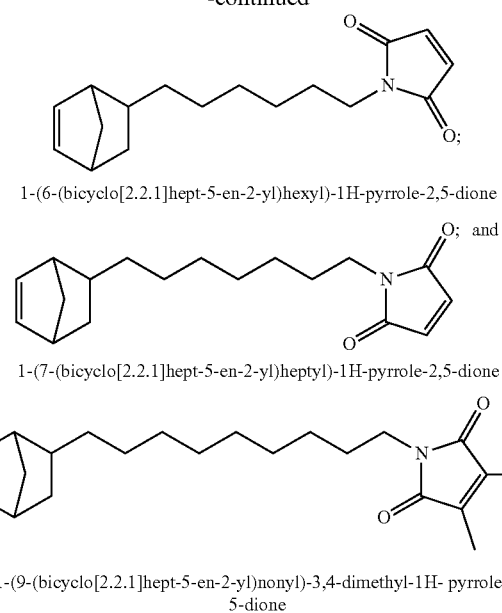

1-(6-(bicyclo[2.2.1]hept-5-en-2-yl)hexyl)-1H-pyrrole-2,5-dione 1-(7-(bicyclo[2.2.1]hept-5-en-2-yl)heptyl)-1H-pyrrole-2,5-dione 1-(9-(bicyclo[2.2.1]hept-5-en-2-yl)nonyl)-3,4-dimethyl-1H-pyrrole-2,5-dione

6. The photoalignment layer of claim 2, wherein said repeating unit is derived from any one of the monomers selected from the group consisting of:

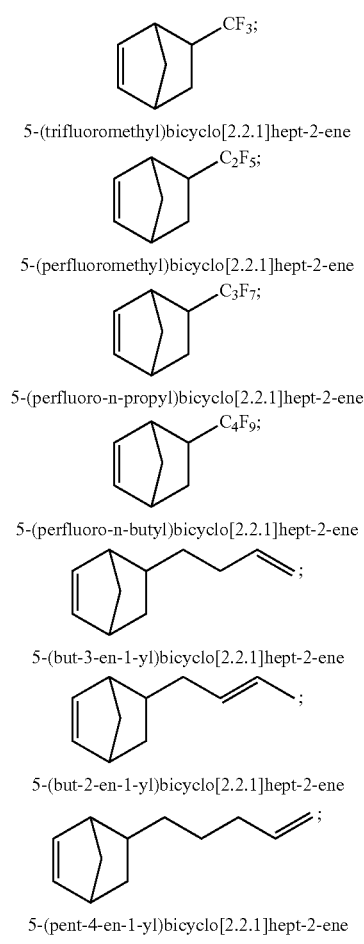

5-(trifluoromethyl)bicyclo[2.2.1]hept-2-ene 5-(perfluoromethyl)bicyclo[2.2.1]hept-2-ene 5-(perfluoro-n-propyl)bicyclo[2.2.1]hept-2-ene 5-(perfluoro-n-butyl)bicyclo[2.2.1]hept-2-ene 5-(but-3-en-1-yl)bicyclo[2.2.1]hept-2-ene 5-(but-2-en-1-yl)bicyclo[2.2.1]hept-2-ene 5-(pent-4-en-1-yl)bicyclo[2.2.1]hept-2-ene -continued

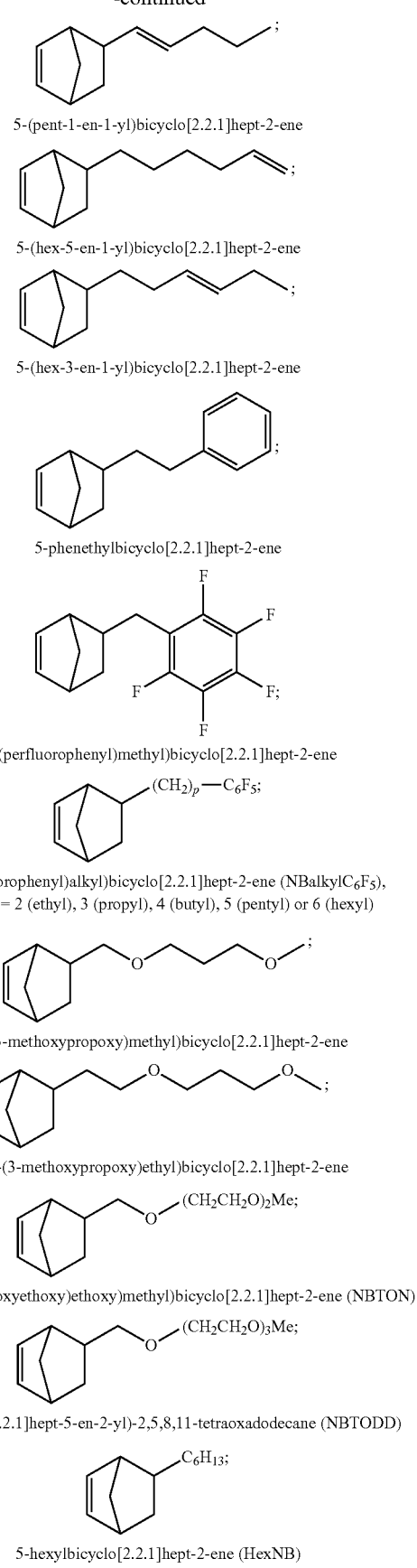

5-(pent-1-en-1-yl)bicyclo[2.2.1]hept-2-ene 5-(hex-5-en-1-yl)bicyclo[2.2.1]hept-2-ene 5-(hex-3-en-1-yl)bicyclo[2.2.1]hept-2-ene 5-phenethylbicyclo[2.2.1]hept-2-ene 5-((perfluorophenyl)methyl)bicyclo[2.2.1]hept-2-ene 5-((perfluorophenyl)alkyl)bicyclo[2.2.1]hept-2-ene (NBalkylC$_6$F$_5$), where p = 2 (ethyl), 3 (propyl), 4 (butyl), 5 (pentyl) or 6 (hexyl)

5-((3-methoxypropoxy)methyl)bicyclo[2.2.1]hept-2-ene 5-(2-(3-methoxypropoxy)ethyl)bicyclo[2.2.1]hept-2-ene 5-((2-(2-methoxyethoxy)ethoxy)methyl)bicyclo[2.2.1]hept-2-ene (NBTON)

1-(bicyclo[2.2.1]hept-5-en-2-yl)-2,5,8,11-tetraoxadodecane (NBTODD)

5-hexylbicyclo[2.2.1]hept-2-ene (HexNB)

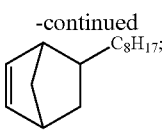

5-octylbicyclo[2.2.1]hept-2-ene (OctNB)

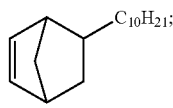

5-decylbicyclo[2.2.1]hept-2-ene (DecNB)

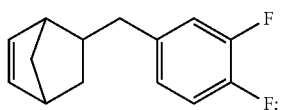

5-(3,4-difluorobenzyl)bicyclo[2.2.1]hept-2-ene (NBCH$_2$C$_6$H$_3$F$_2$)

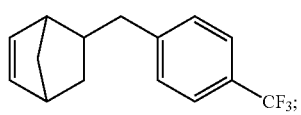

5-(4-(trifluoromethyl)benzyl)bicyclo[2.2.1]hept-2-ene (NBCH$_2$C$_6$H$_4$F$_3$)

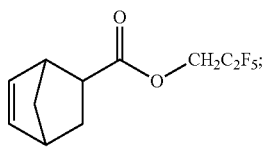

2,2,3,3,3-pentafluoropropyl bicyclo[2.2.1]hept-5-ene-2-carboxylate (PFPrCNB)

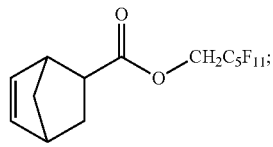

perfluoropentylmethyl bicyclo[2.2.1]hept-5-ene-2-carboxylate (PFPMeCNB)

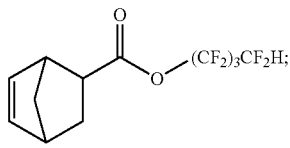

1,1,2,2,3,3,4,4-octafluorobutyl bicyclo[2.2.1]hept-5-ene-2-carboxylate (FOCHNB)

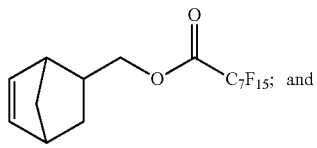

bicyclo[2.2.1]hept-5-en-2-ylmethyl perfluorooctanoate (C$_8$PFAcNB)

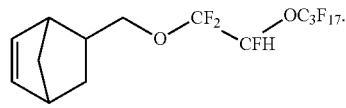

5-((1,1,2-triflouro-2-perfluoropropoxy)ethoxy)methyl)bicyclo[2.2.1]hept-2-ene (PPVENB)

7. The photoalignment layer of claim 1, wherein the polymer is a homopolymer derived from a monomer of formula:

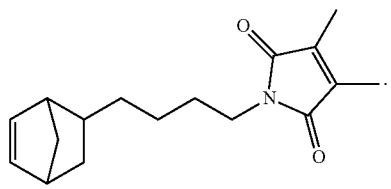

1-(4-bicyclo[2.2.1]hept-5-en-2-yl)butyl)-3,4-dimethyl-1H-pyrrole-2,5-dione

8. A method for preparing a photoalignment layer for liquid crystal displays comprising:
coating a surface of a substrate with a composition comprising a polymer, said polymer as defined in claim 1, and a photosensitizer as defined in claim 1; and
exposing the polymer coated substrate to a polarized electromagnetic radiation so as to form a photoaligned polymer layer.

9. The method of claim 8, wherein said polymer further comprising one or more repeating units distinct from each other and each represented by formula (IIA), said repeating unit is derived from a corresponding monomer of formula (II):

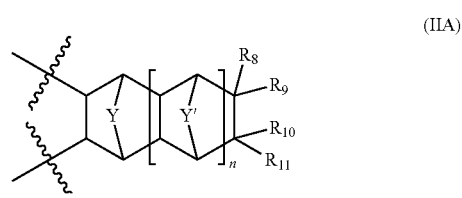

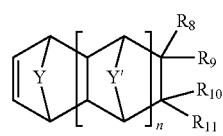

wherein
∿∿ represents a position at which the bonding takes place with another repeat unit;
n is an integer from 0 to 3;
Y and Y' are the same or different and independently of each other selected from the group consisting of —CH$_2$—, —CH$_2$—CH$_2$— and —O—;
R$_8$, R$_9$, R$_{10}$ and R$_{11}$ are the same or different and independently of each other selected from the group consisting of hydrogen, methyl, ethyl, a fluorinated or perfluorinated methyl or ethyl, a linear or branched substituted or unsubstituted (C$_3$-C$_{25}$)hydrocarbyl group, substituted or unsubstituted (C$_1$-C$_{25}$)heterohydrocarbyl group, substituted or unsubstituted (C$_3$-C$_{25}$) cyclic hydrocarbyl group, substituted or unsubstituted (C$_6$-C$_{25}$)polycyclic hydrocarbyl group, substituted or unsubstituted (C$_3$-C$_{25}$)cyclic heterohydrocarbyl group and substituted or unsubstituted (C$_6$-C$_{25}$)polycyclic heterohydrocarbyl group.

10. A method for preparing a photoalignment layer for liquid crystal displays comprising:
coating separately a surface of a first substrate and a surface of a second substrate with a composition comprising a polymer, said polymer comprising one or more repeating units distinct from each other and each represented by formula (IA), said repeating unit is derived from a corresponding monomer of formula (I):

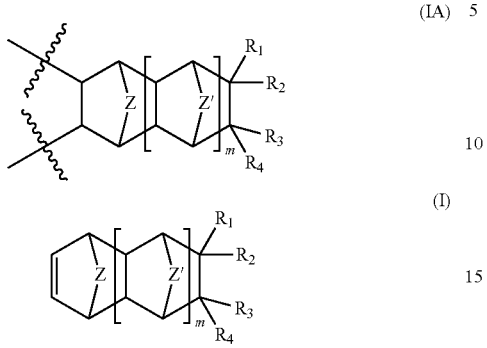

wherein:
~~~ represents a position at which the bonding takes place with another repeat unit;
Z and Z' are the same or different and independently of each other selected from the group consisting of —CH$_2$—, —CH$_2$—CH$_2$— and —O—;
m is an integer from 0 to 5;
at least one of R$_1$, R$_2$, R$_3$ or R$_4$ is selected from the group consisting of:

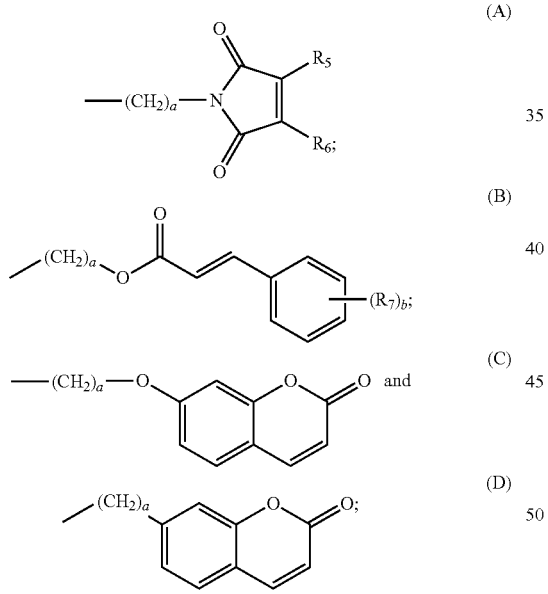

wherein:
a is an integer from 1 to 12;
b is an integer from 1 to 4;
R$_5$ and R$_6$ are each independently of one another selected from the group consisting of hydrogen, methyl, ethyl and linear or branched (C$_3$-C$_4$)alkyl; or
R$_5$ and R$_6$ taken together with the carbon atoms to which they are attached form a substituted or unsubstituted (C$_5$-C$_8$)cyclic ring;
R$_7$ is selected from the group consisting of methyl, ethyl, line r or branched (C$_3$-C$_4$)alkyl, methoxy, ethoxy, linear or branched (C$_3$-C$_4$)alkoxy, (C$_6$-C$_{10}$)aryl and (C$_6$-C$_{10}$)aryloxy;

the remaining R$_1$, R$_2$, R$_3$ and R$_4$ are the same or different and independently of each other selected from the group consisting of hydrogen, halogen, methyl, ethyl, a fluorinated or perfluorinated methyl or ethyl, linear or branched substituted or unsubstituted (C$_3$-C$_{12}$)alkyl, substituted or unsubstituted (C$_1$-C$_6$)alkoxy, substituted or unsubstituted (C$_3$-C$_8$)cycloalkyl, substituted or unsubstituted (C$_7$-C$_{12}$)bicycloalkyl and substituted or unsubstituted (C$_7$-C$_{12}$)tricycloalkyl, substituted or unsubstituted (C$_1$-C$_{12}$)alkyl(C$_3$-C$_8$)cycloalkyl, substituted or unsubstituted (C$_6$-C$_{10}$)aryl and substituted or unsubstituted (C$_1$-C$_{12}$)alkyl(C$_6$-C$_{16}$)aryl where said substituents are selected from halogen, hydroxy, (C$_1$-C$_6$)alkyl, (C$_1$-C$_6$)alkoxy, (C$_2$-C$_6$)alkenyl, (C$_3$-C$_8$)cycloalkyl, (C$_7$-C$_{12}$)bicycloalkyl, (C$_1$-C$_6$)alkoxy(C$_3$-C$_6$)alkyl, (C$_1$-C$_6$)alkoxy(C$_3$-C$_8$)cycloalkyl or (C$_1$-C$_6$)alkoxy(C$_7$-C$_{12}$)bicycloalkyl; and
said composition further comprising a photosensitizer of the formula:

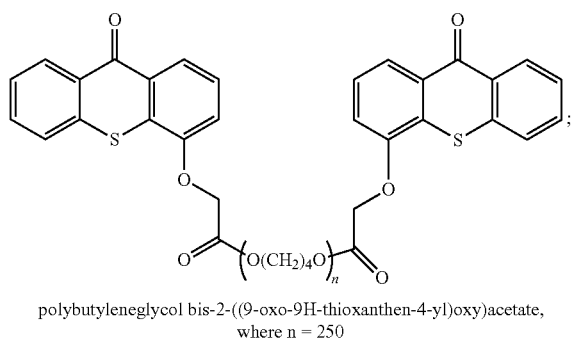

polybutyleneglycol bis-2-((9-oxo-9H-thioxanthen-4-yl)oxy)acetate, where n = 250 and
exposing separately the polymer coated first substrate and the polymer coated second substrate to a polarized electromagnetic radiation so as to form a photoaligned polymer layer.

11. The method of claim 10, wherein said polymer further comprising one or more repeating units distinct from each other and each represented by formula (IIA), said repeating unit is derived from a corresponding monomer of formula (II):

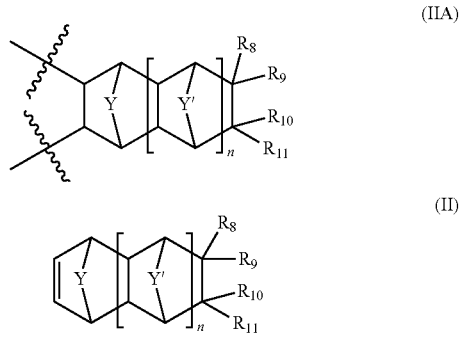

wherein
~~~ represents a position at which the bonding takes place with another repeat unit;
n is an integer from 0 to 3;

Y and Y' are the same or different and independently of each other selected from the group consisting of —CH$_2$—, —CH$_2$—CH$_2$— and —O—;

R$_8$, R$_9$, R$_{10}$ and R$_{11}$ are the same or different and independently of each other selected from the group consisting of hydrogen, methyl, ethyl, a fluorinated or perfluorinated methyl or ethyl, a linear or branched substituted or unsubstituted (C$_3$-C$_{25}$)hydrocarbyl group, substituted or unsubstituted (C$_1$-C$_{25}$)heterohydrocarbyl group, substituted or unsubstituted (C$_3$-C$_{25}$) cyclic hydrocarbyl group, substituted or unsubstituted (C$_6$-C$_{25}$)polycyclic hydrocarbyl group, substituted or unsubstituted (C$_3$-C$_{25}$)cyclic heterohydrocarbyl group and substituted or unsubstituted (C$_6$-C$_{25}$)polycyclic heterohydrocarbyl group.

12. The method of claim 10, wherein the polymer is a homopolymer derived from a monomer of formula:

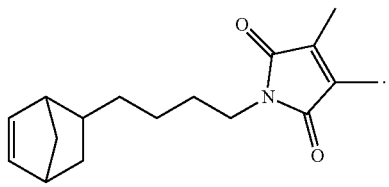

1-(4-bicyclo[2.2.1]hept-5-en-2-yl)butyl)-3,4-dimethyl-1H-pyrrole-2,5-dione

13. The method of claim 10, wherein said substrate is glass coated with indium-tin oxide.

14. The method of claim 10, which further comprises:
depositing along the long edges of the polymer coated first substrate a strip of glass beads and an adhesive layer;
placing the second polymer coated substrate over the first substrate such that the second substrate is directly in contact with the adhesive layer on the long edges, and the polymer coated surface of first substrate and the polymer coated surface of the second substrate are directly facing each other so as to form a gap between said polymer coated first substrate and said polymer coated second substrate;
masking the gap between said first substrate and said second substrate; and
exposing the first and second substrates to an electromagnetic radiation in order to cure the adhesive and to fix the gap between the first and the second substrate.

15. The method of claim 14, which further comprises filling the gap between the first and the second substrate with a liquid crystal.

16. The method of claim 15, wherein the liquid crystal is filled in such a manner that the liquid crystal is placed parallel to the photoaligned polymeric layer.

17. The method of claim 15, wherein the liquid crystal is filled at a temperature from 40° C. to 60° C.

18. A method for preparing a photoalignment layer for liquid crystal displays comprising:
coating separately a surface of a first substrate and a surface of a second substrate with a composition comprising a polymer, said polymer comprising one or more repeating units distinct from each other and each represented by formula (IA), said repeating unit is derived from a corresponding monomer of formula (I):

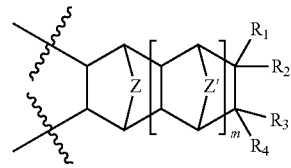 (IA)

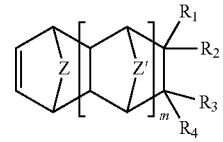 (I)

wherein:
⌇ represents a position at which the bonding takes place with another repeat unit;
Z and Z' are the same or different and independently of each other selected from the group consisting of —CH$_2$—, —CH$_2$—CH$_2$— and —O—;
m is an integer from 0 to 5;
at least one of R$_1$, R$_2$, R$_3$ or R$_4$ is selected from the group consisting of:

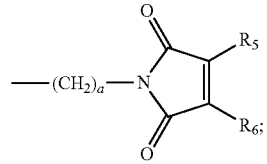 (A)

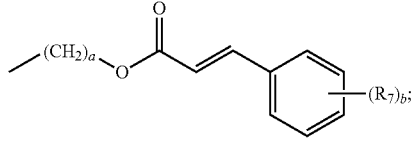 (B)

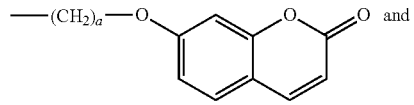 (C) and

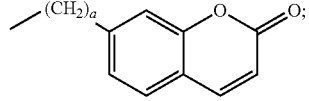 (D)

wherein:
a is an integer from 1 to 12;
b is an integer from 1 to 4;
R$_5$ and R$_6$ are each independently of one another selected from the group consisting of hydrogen, methyl, ethyl and linear or branched (C$_3$-C$_4$)alkyl; or
R$_5$ and R$_6$ taken together with the carbon atoms to which they are attached form a substituted or unsubstituted (C$_5$-C$_8$)cyclic ring;
R$_7$ is selected from the group consisting of methyl, ethyl, linear or branched (C$_3$-C$_4$)alkyl, methoxy, ethoxy, linear or branched (C$_3$-C$_4$)alkoxy, (C$_6$-C$_{10}$) aryl and (C$_6$-C$_{10}$)aryloxy;
the remaining R$_1$, R$_2$, R$_3$ and R$_4$ are the same or different and independently of each other selected from the group consisting of hydrogen, halogen, methyl, ethyl, a fluorinated or perfluorinated methyl or ethyl, linear or branched substituted or unsubstituted $(C_3-C_{12})$alkyl, substituted or unsubstituted $(C_1-C_6)$alkoxy, substituted or unsubstituted $(C_3-C_8)$cycloalkyl, substituted or unsubstituted $(C_7-C_{12})$ bicycloalkyl and substituted or unsubstituted $(C_7-C_{12})$tricycloalkyl, substituted or unsubstituted $(C_1-C_{12})$alkyl$(C_3-C_8)$cycloalkyl, substituted or unsubstituted $(C_6-C_{10})$aryl and substituted or unsubstituted $(C_1-C_{12})$alkyl$(C_6-C_{16})$aryl where said substituents are selected from halogen, hydroxy, $(C_1-C_6)$alkyl, $(C_1-C_6)$alkoxy, $(C_2-C_6)$alkenyl, $(C_3-C_8)$ cycloalkyl, $(C_7-C_{12})$bicycloalkyl, $(C_1-C_6)$alkoxy $(C_3-C_6)$alkyl, $(C_1-C_6)$alkoxy$(C_3-C_8)$cycloalkyl or $(C_1-C_6)$alkoxy$(C_7-C_{12})$bicycloalkyl; and said composition further comprising a photosensitizer of the formula:

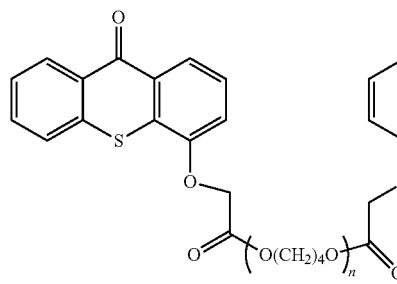

polybutyleneglycol bis-2-((9-oxo-9H-thioxanthen-4-yl)oxy)acetate, where n = 250;

and exposing separately the polymer coated first substrate and the polymer coated second substrate to a polarized electromagnetic radiation so as to form a photoaligned polymer layer;

depositing along the long edges of the polymer coated first substrate a strip of glass beads and an adhesive layer;

placing the second polymer coated substrate over the first substrate such that the second substrate is directly in contact with the adhesive layer on the long edges, and the polymer coated surface of first substrate and the polymer coated surface of the second substrate are directly facing each other so as to form a gap between said polymer coated first substrate and said polymer coated second substrate;

masking the gap between said first substrate and said second substrate; and exposing the first and second substrates to an electromagnetic radiation in order to cure the adhesive and to fix the gap between the first and the second substrate; and filling the gap between the first and the second substrate with a liquid crystal in such a manner that the liquid crystal is placed parallel to the photoaligned polymeric layer.

19. A liquid crystal display device comprising:

a first and a second substrate coated with a photoaligned polymer layer, wherein said photoaligned polymer comprising one or more repeating units distinct from each other and each represented by formula (IA), said repeating unit is derived from a corresponding monomer of formula (I):

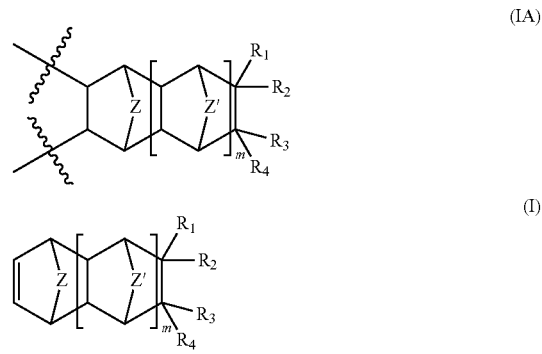

wherein:

⌇ represents a position at which the bonding takes place with another repeat unit;

Z and Z' are the same or different and independently of each other selected from the group consisting of —$CH_2$—, —$CH_2$—$CH_2$— and —O—;

m is an integer from 0 to 5;

at least one of $R_1$, $R_2$, $R_3$ or $R_4$ is selected from the group consisting of:

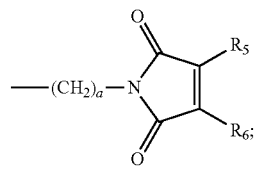

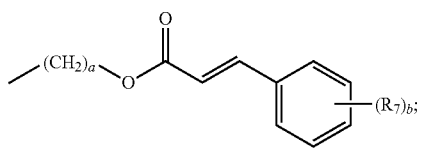

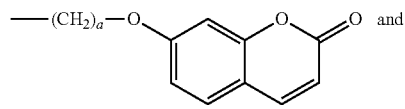

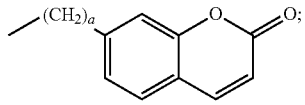

wherein:

a is an integer from 1 to 12;

b is an integer from 1 to 4;

$R_5$ and $R_6$ are each independently of one another selected from the group consisting of hydrogen, methyl, ethyl and linear or branched $(C_3-C_4)$alkyl; or $R_5$ and $R_6$ taken together with the carbon atoms to which they are attached form a substituted or unsubstituted $(C_5-C_8)$cyclic ring;

$R_7$ is selected from the group consisting of methyl, ethyl, linear or branched $(C_3-C_4)$alkyl, methoxy, ethoxy, linear or branched $(C_3-C_4)$alkoxy, $(C_6-C_{10})$ aryl and $(C_6-C_{10})$aryloxy;

the remaining $R_1$, $R_2$, $R_3$ and $R_4$ are the same or different and independently of each other selected from the group consisting of hydrogen, halogen, methyl, ethyl, a fluorinated or perfluorinated methyl or ethyl, linear or branched substituted or unsubstituted ($C_3$-$C_{12}$)alkyl, substituted or unsubstituted ($C_1$-$C_6$)alkoxy, substituted or unsubstituted ($C_3$-$C_8$)cycloalkyl, substituted or unsubstituted ($C_7$-$C_{12}$)bicycloalkyl and substituted or unsubstituted ($C_7$-$C_{12}$)tricycloalkyl, substituted or unsubstituted ($C_1$-$C_{12}$)alkyl($C_3$-$C_8$)cycloalkyl, substituted or unsubstituted ($C_6$-$C_{10}$)aryl and substituted or unsubstituted ($C_1$-$C_{12}$)alkyl($C_6$-$C_{16}$)aryl where said substituents are selected from halogen, hydroxy, ($C_1$-$C_6$)alkyl, ($C_1$-$C_6$)alkoxy, ($C_2$-$C_6$)alkenyl, ($C_3$-$C_8$)cycloalkyl, ($C_7$-$C_{12}$)bicycloalkyl, ($C_1$-$C_6$)alkoxy($C_3$-$C_6$)alkyl, ($C_1$-$C_6$)alkoxy($C_3$-$C_8$)cycloalkyl or ($C_1$-$C_6$)alkoxy($C_7$-$C_{12}$)bicycloalkyl; and said photoaligned polymer layer further comprising a photosensitizer of the formula:

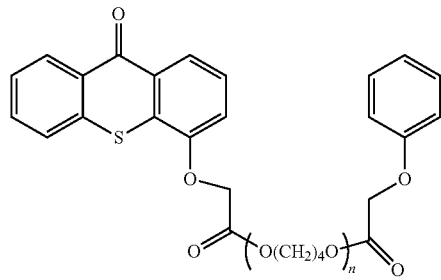

polybutyleneglycol bis-2-((9-oxo-9H-thioxanthen-4-yl)oxy)acetate, where n = 250;

and a liquid crystal disposed between, said first and second substrate directly in contact with said photoaligned polymer layers.

20. The liquid crystal display device of claim 19, wherein the polymer is a homopolymer derived from a monomer of formula:

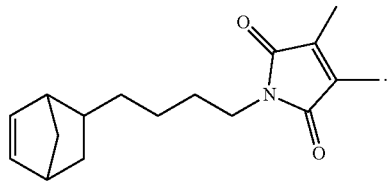

1-(4-bicyclo[2.2.1]hept-5-en-2-yl)butyl)-3,4-dimethyl-1H-pyrrole-2,5-dione

21. The liquid crystal display device of claim 19, wherein the thickness of said first and second photoaligned polymer layer is at least 3 nm.

\* \* \* \* \*